US012782152B2

(12) United States Patent
Ivanov et al.

(10) Patent No.: US 12,782,152 B2
(45) Date of Patent: Nov. 3, 2026

(54) METHODS AND SYSTEMS FOR NAVIGATION GUIDANCE BASED ON DRIVER STATE EVENTS

(71) Applicant: Harman Becker Automotive Systems GmbH, Karlsbad-Ittersbach (DE)

(72) Inventors: Volodymyr Ivanov, Odelzhausen (DE); Eric Theisinger, Otterbach (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 27 days.

(21) Appl. No.: 18/725,668

(22) PCT Filed: Dec. 29, 2022

(86) PCT No.: PCT/IB2022/062853
§ 371 (c)(1),
(2) Date: Jun. 28, 2024

(87) PCT Pub. No.: WO2023/126861
PCT Pub. Date: Jul. 6, 2023

(65) Prior Publication Data

US 2025/0067570 A1 Feb. 27, 2025

Related U.S. Application Data

(60) Provisional application No. 63/266,167, filed on Dec. 29, 2021.

(51) Int. Cl.
*G01C 21/00* (2006.01)
*G01C 21/34* (2006.01)
(Continued)

(52) U.S. Cl.
CPC ..... *G01C 21/3617* (2013.01); *G01C 21/3461* (2013.01); *G01C 21/3641* (2013.01);
(Continued)

(58) Field of Classification Search
CPC ............ G01C 21/3617; G01C 21/3461; G01C 21/3641; G01C 21/3878; G01C 21/3667;
(Continued)

(56) References Cited

U.S. PATENT DOCUMENTS

2008/0319602 A1 12/2008 McClellan et al.
2016/0046298 A1* 2/2016 DeRuyck ............. B60K 28/066 340/576

(Continued)

FOREIGN PATENT DOCUMENTS

GB 2583960 A * 11/2020 ........... G06V 20/597
JP 2009293996 A 12/2019
WO 2020204884 A1 10/2020

OTHER PUBLICATIONS

A. Abdelrahman, A. S. El-Wakeel, A. Noureldin and H. S. Hassanein, "Crowdsensing-Based Personalized Dynamic Route Planning for Smart Vehicles," in IEEE Network, vol. 34, No. 3, pp. 216-223, May/Jun. 2020, doi: 10.1109/MNET.001.1900368. (Year: 2020).*

(Continued)

*Primary Examiner* — Anne Marie Antonucci
*Assistant Examiner* — Jordan T Smith
(74) *Attorney, Agent, or Firm* — McCoy Russell LLP

(57) ABSTRACT

Disclosed herein are systems and methods for generating and displaying navigation guidance by utilizing data acquired by an advanced driver assistance system (ADAS) for driver behavior prediction and route planning. In embodiments, a method comprises generating navigation guidance based on a plurality of driver state events detected via an ADAS, and outputting the navigation guidance via a
(Continued)

navigation system, wherein the navigation guidance comprises at least one of a map layer and a route recommendation.

20 Claims, 9 Drawing Sheets

(51) Int. Cl.

| | |
|---|---|
| ***G01C 21/36*** | (2006.01) |
| ***G06V 10/762*** | (2022.01) |
| ***G06V 20/59*** | (2022.01) |
| ***G06V 40/16*** | (2022.01) |

(52) U.S. Cl.

CPC ....... *G01C 21/3878* (2020.08); *G06V 10/762* (2022.01); *G06V 20/597* (2022.01); *G06V 40/171* (2022.01)

(58) Field of Classification Search

CPC ............. G01C 21/3848; G06V 10/762; G06V 20/597; G06V 40/171

See application file for complete search history.

(56) References Cited

U.S. PATENT DOCUMENTS

| | | | | |
|---|---|---|---|---|
| 2016/0307285 | A1 | 10/2016 | Gallagher | |
| 2017/0158054 | A1 | 6/2017 | Munaoka et al. | |
| 2017/0186321 | A1 | 6/2017 | Dai | |
| 2018/0075309 | A1* | 3/2018 | Sathyanarayana | G05D 1/0088 |
| 2019/0162549 | A1* | 5/2019 | Fouad | G06N 3/006 |
| 2019/0382029 | A1* | 12/2019 | Golov | B60T 7/18 |
| 2021/0097408 | A1* | 4/2021 | Sicconi | B60W 50/14 |
| 2021/0188289 | A1* | 6/2021 | Oba | G08G 1/16 |
| 2021/0339759 | A1* | 11/2021 | Fouad | A61B 5/0077 |
| 2022/0126864 | A1* | 4/2022 | Moustafa | B60W 40/09 |
| 2024/0286644 | A1* | 8/2024 | Elimaleh | B60W 60/0015 |

OTHER PUBLICATIONS

ISA European Patent Office, International Search Report and Written Opinion Issued in Application No. PCT/IB2022/062853, Apr. 3, 2023, WIPO, 13 pages.

* cited by examiner

METHODS AND SYSTEMS FOR NAVIGATION GUIDANCE BASED ON DRIVER STATE EVENTS

CROSS-REFERENCE TO RELATED APPLICATIONS

The present application is a U.S. National Phase of International Application PCT/IB2022/062853, entitled "METHODS AND SYSTEMS FOR No. NAVIGATION GUIDANCE BASED ON DRIVER STATE EVENTS", and filed on Dec. 29, 2022. International Application No. PCT/IB2022/062853 claims priority to U.S. Provisional Application No. 63/266,167, entitled "METHODS AND SYSTEMS FOR NAVIGATION GUIDANCE BASED ON DRIVER STATE EVENTS", and filed on Dec. 29, 2021. The entire contents of the above-listed applications are hereby incorporated by reference for all purposes.

FIELD

The disclosure relates generally to generating navigation guidance based on driver state monitoring.

BACKGROUND

Some vehicles may include an advanced driver assistance system (ADAS) that may assist a driver of the vehicle during vehicle operation. For example, the ADAS may perform driver monitoring and take various escalating actions in response to detecting driver drowsiness or distraction. Such actions may include, for example, outputting a driver alert, increasing lane-keeping assistance, slowing the vehicle, and stopping the vehicle.

However, the inventors herein have recognized that some driving situations may result in a higher frequency of driver drowsiness and/or distraction. For example, continuous driving for long durations and driving on long, unchanging roads may increase driver drowsiness. As another example, road-side attractions and scenic views may increase driver distraction. As such, the inventors herein have recognized that data acquired by the ADAS may be advantageously used to generate navigation guidance in order to reduce incidents of driver drowsiness and/or distraction.

SUMMARY

In various embodiments, the issues described above may be addressed by methods for generating navigation guidance based on a plurality of driver state events detected via an advanced driver assistance system (ADAS), and outputting the navigation guidance via a navigation system. The methods may detect each driver state event of the plurality of driver state events via the ADAS. The methods may tag each driver state event of the plurality of driver state events with a location of occurrence and/or a time of occurrence. The methods may statistically group the plurality of driver state events with respect to the location of occurrence and/or the time of occurrence, such as via a cluster analysis. The navigation guidance may comprise a map layer and/or a route recommendation that reduces vehicle travel through locations and travel times having high driver state event clustering. In this way, driver drowsiness and/or distraction may be reduced by reducing travel through areas that have a statistically higher incidence of driver state events.

In some embodiments, the issues described above may be addressed by methods for generating a navigation route for a vehicle based on navigation guidance determined from at least one of data collected within the vehicle (e.g., internally provided data) and externally provided data. The navigation guidance may comprise a map layer and/or a route recommendation determined based on driver state events. The externally provided data may comprise data received from a cloud computing system, and the route recommendation may comprise a general vehicle route recommendation. The methods may determine the general vehicle route recommendation via the cloud computing system based on an occurrence of the driver state events from a plurality of different ADAS reported to the cloud computing system for a plurality of drivers. The general vehicle route recommendation may reduce travel through the locations having statistically significant clusters of the driver state events. The internally provided data may comprise the driver state events for a driver of the vehicle. The methods may detect the driver state events for the driver of the vehicle based at least on images of the driver received from an in-vehicle camera. The route recommendation may additionally or alternatively comprise an individualized vehicle route recommendation. The methods may determine the individualized vehicle route recommendation system based on a cluster analysis of the driver state events for the driver of the vehicle. The individualized vehicle route recommendation may reduce travel through the locations having the statistically significant clusters of the driver state events for the driver. In this way, the navigation guidance may be generated based on aggregate data from a plurality of vehicles and/or tailored for a specific individual driver.

In some embodiments, the issues described above may be addressed by a vehicle system, which includes an in-vehicle camera housed within a cabin of the vehicle, an ADAS, and a navigation system with a display, having one or more processors and a non-transitory memory including instructions that, when executed, cause the one or more processors to: detect driver state events in a vehicle based on driver images acquired by the in-vehicle camera, report the driver state events to a cloud computing platform in an anonymized manner, and receive navigation guidance from the cloud computing platform, the navigation guidance determined by one of the cloud computing platform based on the driver state events reported by a plurality of vehicles and a driver profile specific to a driver of the vehicle. The non-transitory memory may include further instructions that, when executed, cause the one or more processors to output the navigation guidance to the display of the navigation system within the vehicle, the navigation guidance comprising at least one of a map layer and a route recommendation. The driver state events may comprise occurrences of at least one of a tired, fatigued, and distracted driver state. The map layer may comprise a heat map indicating statistically significant clusters of the driver state events. The route recommendation may comprise a navigation route that reduces travel through the statistically significant clusters of the driver state events. The map layer and/or the route recommendation may be displayed via the navigation system based on user input to the display of the navigation system. In this way, the systems may advantageously utilize the cloud computing platform for data aggregation, storage, and processing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
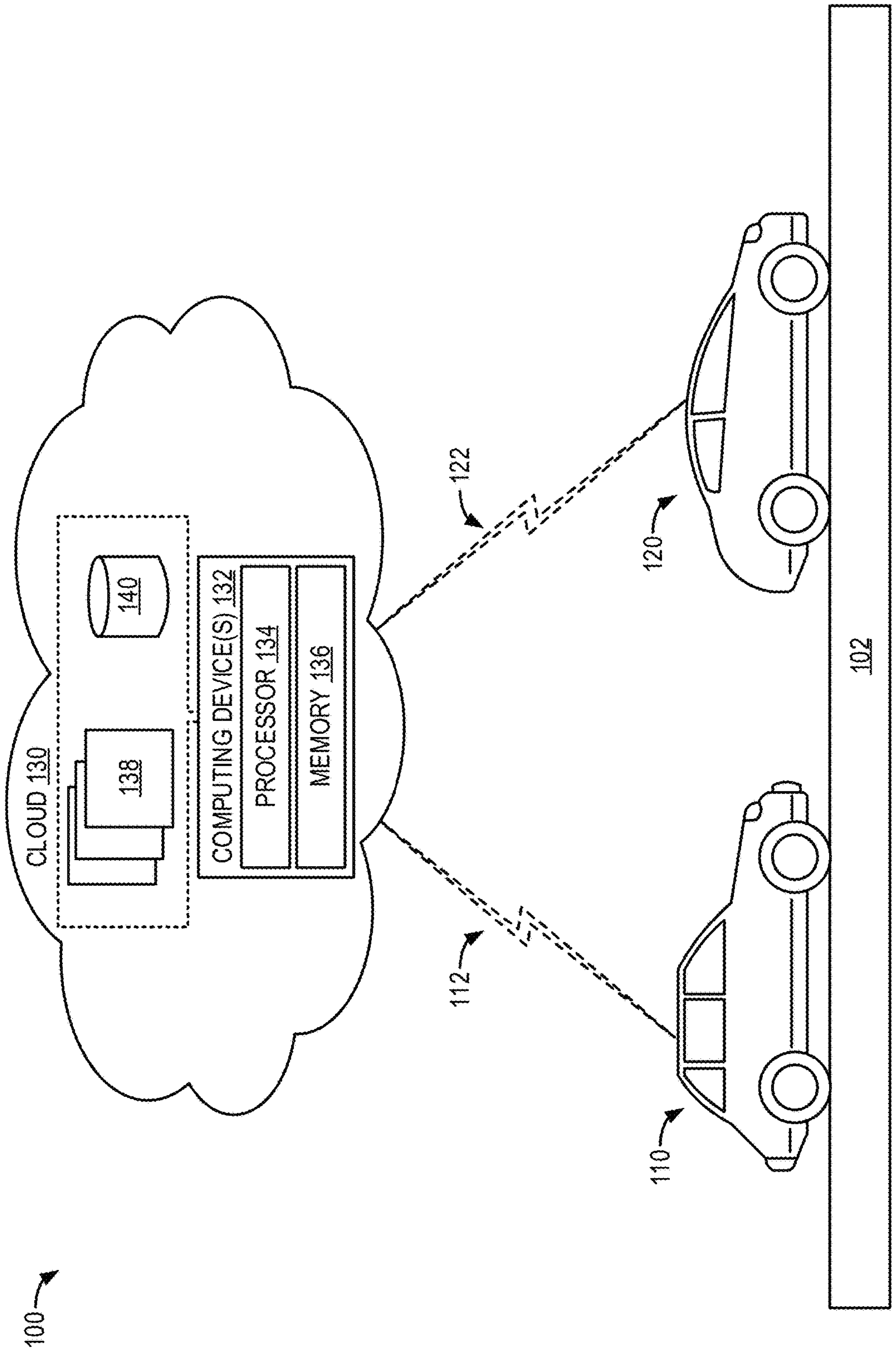
FIG. 1 shows a scenario of vehicle communication with a distributed computing network in accordance with one or more embodiments of the present disclosure.

Disclosed herein are systems and methods for implementing navigation guidance based on driver state events detected by an advanced driver assistance system (ADAS) of a vehicle. For example, a plurality of vehicles may communicate data with a cloud computing platform, such as depicted in FIG. 1. The cloud computing platform may include processing algorithms that analyze driver state events reported by a vehicle to generate navigation guidance that may be transmitted to the vehicles for use in a navigation system, such as diagrammed in FIG. 2. Each driver state event may be detected, at least in part, based on inputs received from in-cabin sensors, such as sensors within the vehicle cabin shown in FIG. 3, and via an in-vehicle computing system, such as shown in FIG. 4. The driver state events may include location- and time-specific instances of a driver of the vehicle being distracted or sleepy, for example, as determined via the method of FIG. 5. The cloud-based processing algorithms may receive the driver state events and generate the navigation guidance according to the method shown in FIG. 6. The navigation guidance may include a map layer that visually indicates areas of statistically higher instances of the driver state events and/or a route recommendation that avoids travel through areas of high occurrence of the driver state events, such as illustrated in FIGS. 7A-7C.

As used herein, the terms "substantially the same as" or "substantially similar to" are construed to mean the same as with a tolerance for variation that a person of ordinary skill in the art would recognize as being reasonable. As used herein, an element or step recited in the singular and preceded with the word "a" or "an" should be understood as not excluding plural of said elements or steps, unless such exclusion is stated. As used herein, terms such as "first," "second," "third," and so on are used merely as labels and are not intended to impose any numerical requirements, any particular positional order, or any sort of implied significance on their objects. As used herein, terminology in which "an embodiment," "some embodiments," or "various embodiments" are referenced signify that the associated features, structures, or characteristics being described are included in at least some embodiments, but are not necessarily in all embodiments. Moreover, the various appearances of such terminology do not necessarily all refer to the same embodiments. As used herein, terminology in which elements are presented in a list using "and/or" language means any combination of the listed elements. For example, "A, B, and/or C" may mean any of the following: A alone; B alone; C alone; A and B; A and C; B and C; or A, B, and C.

FIG. 1 shows a scenario 100 of vehicle communication with a cloud computing platform 130, also referred to herein as cloud 130. Scenario 100 depicts a first vehicle 110 and a second vehicle 120 traveling on a roadway 102. First vehicle 110 is in wireless communication with cloud 130 via a first communication link 112, while second vehicle 120 is in wireless communication with cloud 130 via a second communication link 122. Each of first communication link 112 and second communication link 122 may be, or may include, a point-to-point cellular communication link. First vehicle 110 and second vehicle 120 may accordingly have cellular communication interfaces which may be in wireless communication with a cellular communication interface of cloud 130 over first communication link 112 and second communication link 122, respectively.

Cloud 130 may include memory and/or processors that are standalone or integrally constructed as part of various programmable devices, including, for example, computing device(s) 132 (which may be, or may include, servers or server computing devices). Cloud 130 may facilitate data aggregation, storage, and processing. As depicted in FIG. 1, each of computing device(s) 132 may include a processor 134 and a memory 136. Computing device(s) 132 may be networked together via routers, servers, gateways, and the like so that computing device(s) 132 or portions thereof may communicate with each other to enable a distributed computing infrastructure. Processor 134 may be any suitable processor, processing unit, or microprocessor, for example. Processor 134 may be a multi-processor system, and, thus, may include one or more additional processors that are identical or similar to each other and that are communicatively coupled via an interconnection bus. Memory 136 may include one or more computer-readable storage mediums, including volatile (e.g., transitory) and non-volatile (e.g., non-transitory) media for a storage of electronic-formatted information, such as computer-readable (e.g., executable) instructions, data, and so forth. Examples of memory 136 may include, but are not limited to, random-access memory (RAM), dynamic random-access memory (DRAM), static random-access memory (SRAM), read-only memory (ROM), electrically erasable programmable read-only memory (EEPROM), and flash memory. Further, memory 136 may include removable and non-removable storage media, including solid-state storage devices, optical storage devices, magnetic storage devices, and any other medium which may be used to store the desired electronic format of information and which can be accessed by processor 134.

Cloud 130 may further store data processing algorithm(s) 138 and a database 140, which may be stored on and/or accessed by computing device(s) 132. Data processing algorithm(s) 138 may analyze data received from first vehicle 110 and/or second vehicle 120. Data processing algorithm(s) may output processed data and/or conclusions from the processed data to database 140, first vehicle 110, and/or second vehicle 120. In various embodiments, data processing algorithm(s) 138 may include one or more driver state event analysis algorithms that build road profiles and statistical maps based on driver state events received from first vehicle 110 and/or second vehicle 120, as will be elaborated herein with particular respect to FIG. 2. Thus, in various embodiments, database 140 may include a database of road profiles, a database of driver state events, and/or a database of statistical maps that may be updated as additional driver state events are received.

Figure 2:
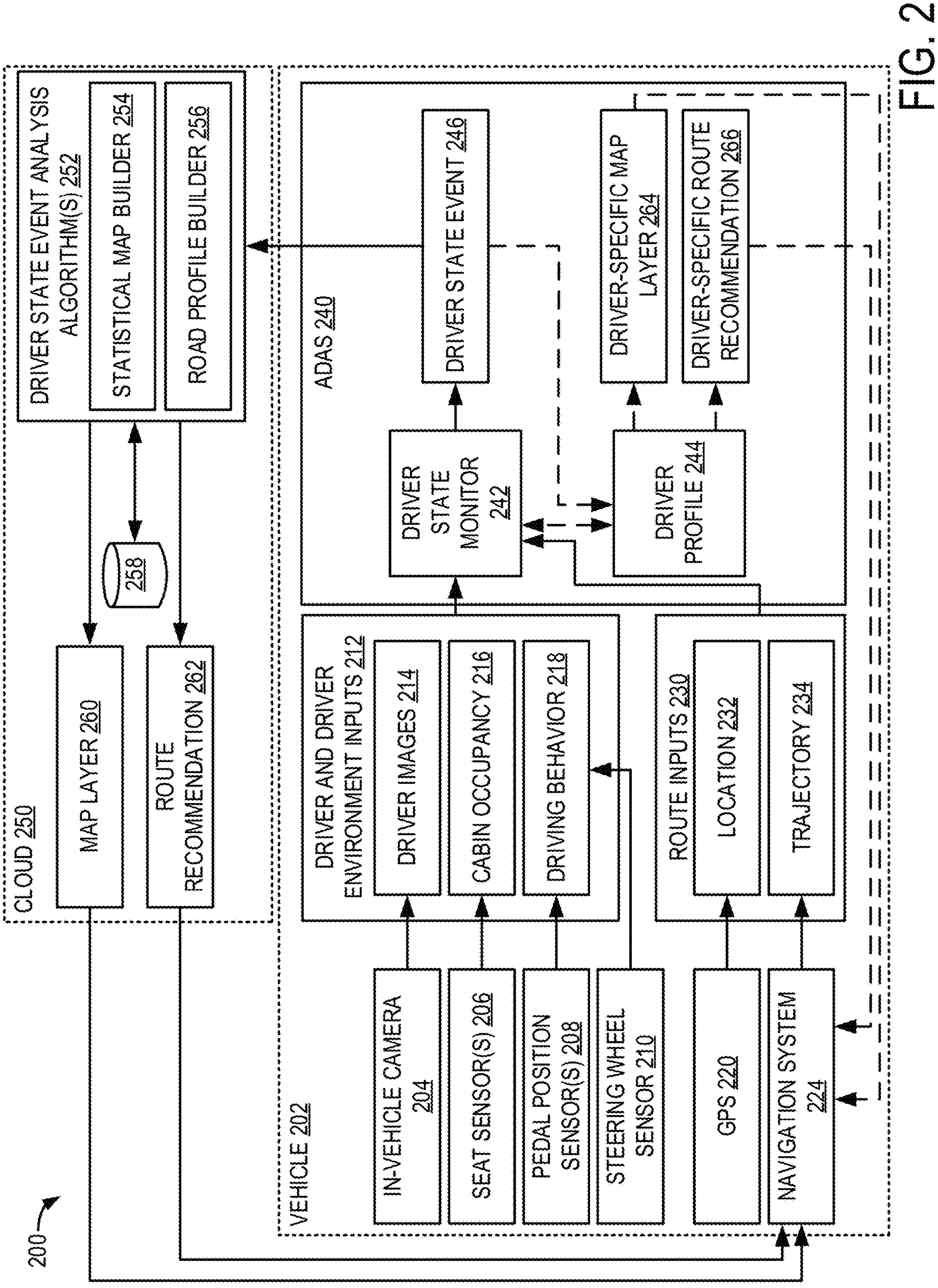
FIG. 2 shows a block diagram of a system for generating navigation guidance based on driver state events in accordance with one or more embodiments of the present disclosure.

Referring now to FIG. 2, a system 200 for generating navigation guidance based on driver state events is shown. System 200 includes a vehicle 202 and a cloud computing platform (e.g., cloud) 250. Cloud 250 may be one embodiment of cloud 130 of FIG. 1. Similarly, vehicle 202 may represent first vehicle 110 or second vehicle 120 of FIG. 1.

Vehicle 202 may include an in-vehicle camera 204 and/or a plurality of sensors that provide information regarding a vehicle environment and a state of a driver operating vehicle 202, collectively referred to as driver and driver environment inputs 212. Driver and driver environment inputs 212 may include driver images 214, a cabin occupancy input 216, and a driving behavior input 218, although other inputs are also possible. As depicted in FIG. 2, the plurality of sensors may include seat sensor(s) 206, pedal position sensor(s) 208, and a steering wheel sensor 210. For example, in-vehicle camera 204 may provide driver images 214, seat sensor(s) 206 may provide a cabin occupancy input 216, and pedal position sensor(s) 208 and steering wheel sensor 210 may provide a driving behavior input 218. Seat sensor(s) 206 may include seatbelt sensors that indicate which seatbelts are in use or unlocked. Additionally or alternatively, seat sensor(s) 206 may include pressure sensors that indicate which seats are occupied. In various embodiments, in-vehicle camera 204 may additionally contribute to cabin occupancy input 216, such as by providing images of any vehicle occupants (including passengers and pets) in addition to driver images 214. Pedal position sensor(s) 208 may include an acceleration pedal position sensor and a brake pedal position sensor. In various embodiments, other sensors may additionally or alternatively provide driver and driver environment inputs 212.

Vehicle 202 may have an ADAS 240. ADAS 240 may include a driver state monitor 242 that receives and analyzes driver and driver environment inputs 212. For example, driver state monitor 242 may include one or more computer vision models and/or image recognition algorithms that analyze facial structures of the driver in driver images 214, such as data points on the eyes and face, to identify a state of the driver, such as whether the driver is awake or asleep, alert or tired (e.g., sleepy, drowsy, or fatigued), and focused or distracted, for example. In some embodiments, driver state monitor 242 may further perform facial recognition to determine an identity of the driver.

In some embodiments, driver state monitor 242 may determine a state of the driver (e.g., a driver state) based on driver images 214 alone and without additional inputs. In other embodiments, driver state monitor 242 may further determine the cabin occupancy from cabin occupancy input 216 and driving behavior from driving behavior input 218, which may provide further context into the driver state. For example, driver state monitor 242 may analyze driving behavior input 218 for swerving, hard braking, aggressive acceleration, or other driving behaviors that may be caused by driver drowsiness and/or distraction. As another example, swerving and hard braking may be associated with driver distraction. Further, having cabin occupants may increase driver distraction in some instances.

ADAS 240 may also include a driver profile 244. In various embodiments, driver state monitor 242 may communicate with driver profile 244. Driver profile 244 may help driver state monitor 242 distinguish nominal driving behavior from drowsy and/or distracted driving behavior. For example, driver profile 244 may generate and store driving preferences, such as typical acceleration and braking rates and typical steering behavior, for the identified driver. Additionally or alternatively, driver profile 244 may generate driver-specific navigation guidance, as will be elaborated below.

Driver state monitor 242 additionally receives route inputs 230, which may include a location input 232 and/or a trajectory input 234. In some embodiments, a global positioning system (GPS) 220 may provide location input 232 while a navigation system 224 provides trajectory input 234, such as shown in FIG. 2. In other embodiments, GPS 220 may provide both location input 232 and trajectory input 234, or navigation system 224 may provide both location input 232 and trajectory input 234. Trajectory input 234 may include a travel direction, a name or other identifier of a current road being driven, and information regarding a type of road being driven (e.g., city street, urban road, straight road, curvy road). Trajectory input 234 may be determined in a forward-looking manner, such as when navigation system 224 is actively tracking a route. Additionally or alternatively, trajectory input 234 may be determined retroactively by tracking location input 232 over time.

Driver state monitor 242 outputs a driver state event 246 in response to detecting attention-related driver states that may impair or impede the driver's ability to operate vehicle 202, such as lost concentration, driver distraction, driver sleepiness, and the like. For example, driver state event 246 may be an event (e.g., occurrence or incidence) where the driver is determined to be in a distracted state, a fatigued state, and/or a sleepy state. As such, driver state monitor 242 might not output driver state event 246 in response to the driver being in a focused state or an alert state, for example. Driver state event 246 may be tagged with a location of its occurrence, as determined from route inputs 230, as well as a time of its occurrence (e.g., a timestamp). For example, the timestamp may include a date (e.g., month, day, and year), time, and day of the week. Driver state event 246 may also specify a type of event that occurred (e.g., "distracted state," "asleep state," "drowsy state," "fatigued state"). Further, driver state event 246 may include information from trajectory input 234, such as the trajectory of vehicle 202 for a pre-determined duration of time (e.g., 30 minutes) immediately prior to driver state event 246 occurring.

Driver state event 246 might not include any personal or identifying information regarding the driver. However, in embodiments where driver profile 244 is used to build driver-specific navigation guidance, driver state event 246 may be output to driver profile 244 so that the detected driver state event 246 is associated with a specific individual.

Driver state event 246 is also output to cloud 250 in real-time or nearly real-time as the driver state event is detected. As used herein, the term "real-time" denotes processes executed without intentional delay, such as substantially instantaneously. As mentioned above, driver state event 246 does not include personal or identifying information, including demographic information. Thus, vehicle 202 reports driver state event 246 to cloud 250 in an anonymized manner, and cloud 250 receives anonymized reports for a plurality of driver state event occurrences, including the time and location of each occurrence, from a plurality of vehicles in addition to vehicle 202.

Cloud 250 includes driver state event analysis algorithm(s) 252 that process each received driver state event 246. As shown in system 200, driver state event analysis algorithm(s) 252 may include a road profile builder 256 and/or a statistical map builder 254. Driver state event analysis algorithm(s) 252 may be data processing algorithm(s) 138 of FIG. 1 in various embodiments. Driver state event analysis algorithm(s) 252 also communicate with a database 258, which may be database 140 of FIG. 1 in embodiments. Database 258 may include one or more databases that store road profiles built by road profile builder 256, statistical maps built by statistical map builder 254, and/or a number and type of driver state events reported for a particular location with respect to a time of day, day of the week, calendar date, and so forth.

Statistical map builder 254 may build location maps by statistically grouping driver state event occurrences via cluster analysis algorithms or the like. For example, statistical map builder 254 may perform a point-based or density-based clustering of the received driver state events from a plurality of vehicles to detect areas where driver state events are concentrated and areas where driver state events are sparse or not present. The time of occurrence of the driver state events may be further used in the clustering. Driver state events that are not part of a cluster are not statistically relevant and may be labeled as noise, and thus might not be represented on a map layer 260 output by driver state event analysis algorithm(s) 252, which will be further described below. However, the driver state events labeled as noise may be stored in database 258, as the clustering may change over time as new driver state events are reported.

Road profile builder 256 may store the clustering information from statistical map builder 254 to build a location-specific profile and a time-specific profile for a given roadway as well as information about the type of road (e.g., urban, rural, mountain) and geometry of the road (e.g., straight, curvy) at the location of the clustering as a road profile for the given roadway. In some embodiments, road profile builder 256 may extrapolate information from a first roadway to a second roadway having similar characteristics in order to anticipate areas that may have high incidences of driver state events using a confidence interval with high (e.g., 90% or greater) probability. Thus, driver state event analysis algorithm(s) 252 might not only receive and analyze data from driver state events that have occurred, but also predict driver state events, at least in some embodiments.

Driver state event analysis algorithm(s) 252 may analyze data in substantially real-time and output map layer 260 and/or a route recommendation 262 in substantially real-time. Map layer 260 and/or route recommendation 262 may be received by navigation system 224 of vehicle 202. Map layer 260 may indicate areas having a high concentration (e.g., cluster) of driver state event occurrences, as determined by statistical map builder 254. Map layer 260 may include, for example, a heat map of driver state event occurrences in a location-specific fashion. Map layer 260 may further indicate the driver state event occurrences in a time-specific fashion. For example, map layer 260 may change depending on the time of day to coincide with a time-specific clustering of driver state events, when relevant. As an illustrative example, driving during peak commuting time (e.g., so-called "rush hour") may increase driver fatigue and/or distractedness (e.g., for drivers whose work-day has recently ended, or for individual drivers at predetermined times), and so map layer 260 may show more or different areas during the peak commuting time on weekdays compared with other times of the day or during that same time on weekends.

Route recommendation 262 may include recommended roads of travel to avoid or reduce vehicle travel through areas and times of day having high occurrences of driver state events (e.g., as determined via a first cluster analysis). Further, route recommendation 262 may include location-specific and time-specific information that may be used by navigation system 224 to generate a travel route for vehicle 202, such as when a destination is known. Route recommendation 262 may be a general vehicle route recommendation that is the same for all drivers and all vehicles.

In some embodiments, ADAS 240 may further generate a driver-specific map layer 264 and/or a driver-specific route recommendation 266 based on driver profile 244 (e.g., as determined via a second cluster analysis). For example, driver-specific map layer 264 and/or driver-specific route recommendation 266 may be generated by performing a second cluster analysis on driver state event data for an individual driver. As another example, ADAS 240 may adjust map layer 260 and/or route recommendation 262 such that driver-specific map layer 264 and/or driver-specific route recommendation 266 are generated based on data compiled for a plurality of drivers and tailored for the individual driver.

Thus, navigation guidance may be generated based on data collected within vehicle 202 and/or externally collected data from a plurality of vehicles outside of vehicle 202. Further, the navigation guidance may include generalized guidance (e.g., a generalized map layer, such as map layer 260, and/or a generalized route recommendation, such as route recommendation 262) and/or individualized guidance (e.g., an individualized map layer, such as driver-specific map layer 264, and/or an individualized vehicle route recommendation, such as driver-specific route recommendation 266). In various embodiments, navigation guidance (e.g., a map layer including, for example, a heat map of driver state event occurrences in a location-specific fashion) might be used for additional purposes, such as insurance analysis, infrastructure planning, and so on.

Map layer 260, route recommendation 262, driver-specific map layer 264, and/or driver-specific route recommendation 266 may be displayed to the driver via navigation system 224 in response to user input received from the driver, as will be elaborated herein. In some embodiments, navigation system 224 may output an alert to indicate that map layer 260, route recommendation 262, driver-specific map layer 264, and/or driver-specific route recommendation 266 are available for display. Display of the map layer 260, route recommendation 262, driver-specific map layer 264, and/or driver-specific route recommendation 266 may be chosen via user input to the user interface 418.

System 200 may also provide driver behavior prediction. For example, system 200 may predict that a driver state event may occur on a particular route traveling through locations and times having high occurrences of driver state events due to the increased probability of a driver state event occurring. As another example, system 200 may predict that a driver state event is less likely to occur on routes having no or few clusters of driver state events. Thus, an occurrence of driver state events may be reduced by utilizing map layer 260, route recommendation 262, driver-specific map layer 264, and/or driver-specific route recommendation 266 to reduce travel through areas having increased driver state event occurrence probability (e.g., by reducing an estimated or calculated length of travel in distance, and/or by reducing an estimated or calculated length of travel in time). As another example, by alerting the driver to the high occurrence of driver state events in particular areas or at particular times of day, the driver may travel through the associated areas or driving times with increased focus and caution.

Figure 3:
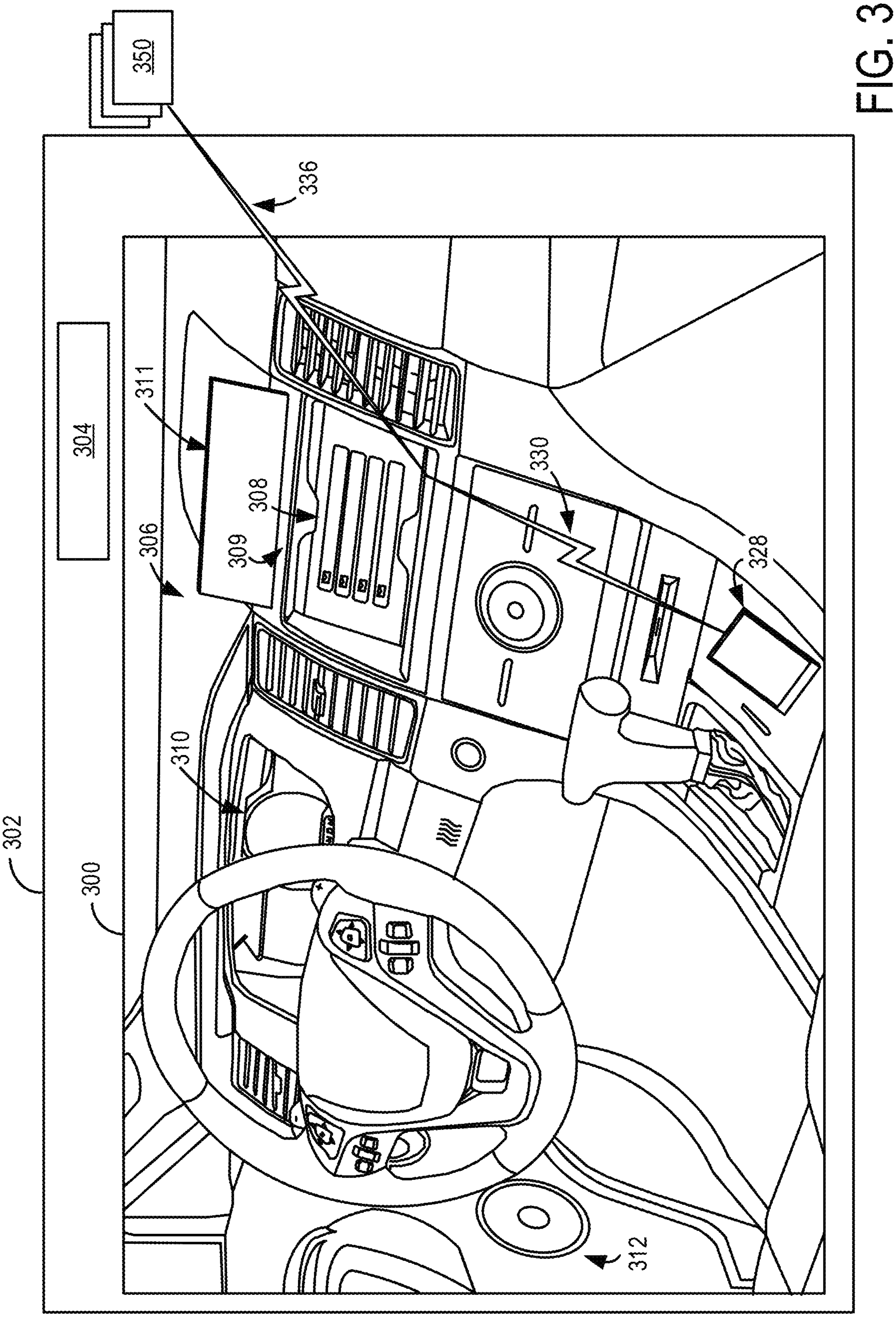
FIG. 3 shows an example partial view of a vehicle cabin in accordance with one or more embodiments of the present disclosure.
Figure 4:
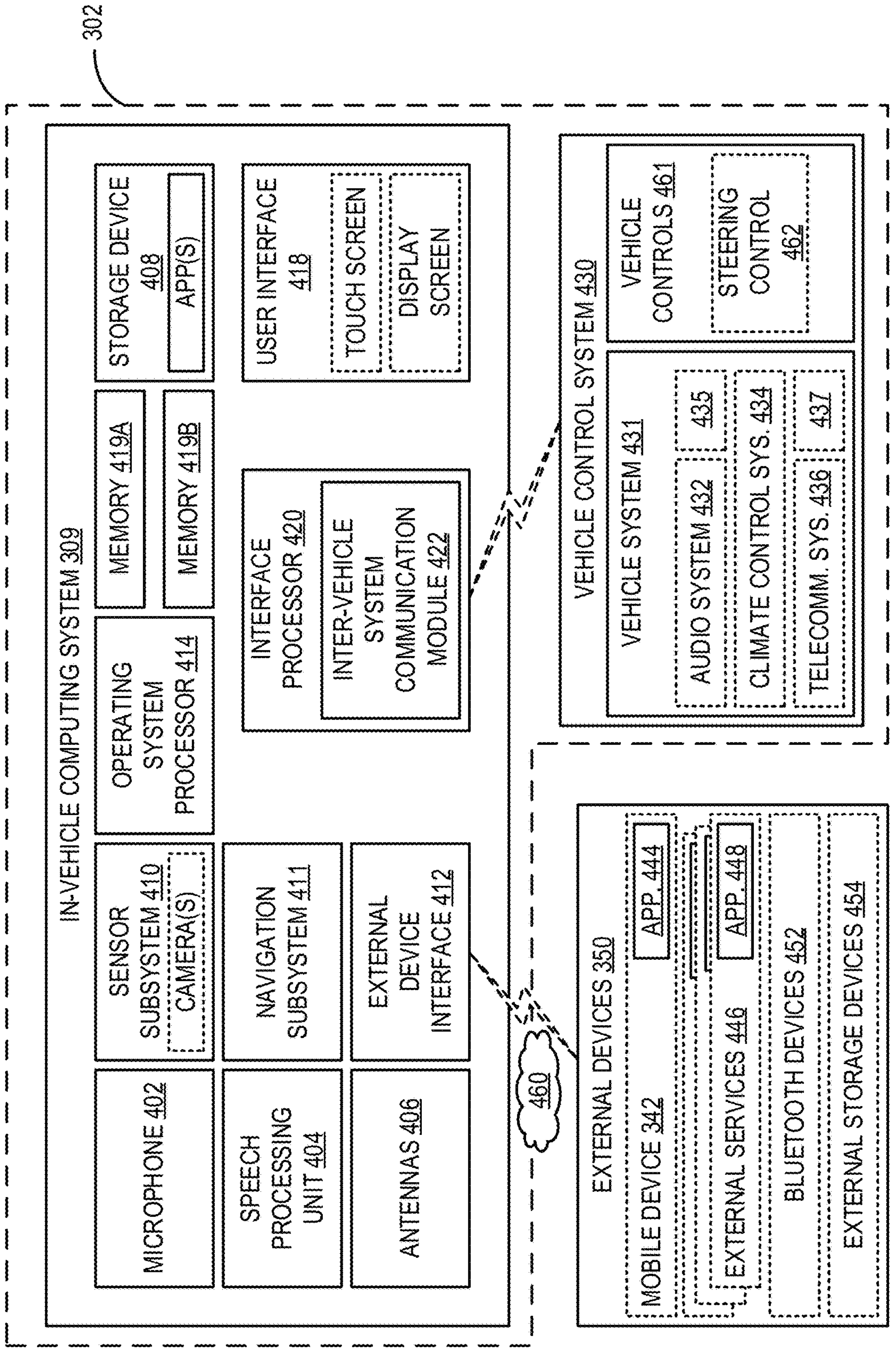
FIG. 4 shows a block diagram of an example in-vehicle computing system of a vehicle in accordance with one or more embodiments of the present disclosure.

FIG. 3 shows an example partial view of an interior of a cabin 300 of a vehicle 302, in which a driver and/or one or more passengers may be seated. Vehicle 302 may be vehicle 202 of FIG. 2, for example. Vehicle 302 of FIG. 3 may be a motor vehicle including drive wheels (not shown) and an internal combustion engine 304. Internal combustion engine 304 may include one or more combustion chambers which may receive intake air via an intake passage and exhaust combustion gases via an exhaust passage. Vehicle 302 may be a road automobile, among other types of vehicles. In some examples, vehicle 302 may include a hybrid propulsion system including an energy conversion device operable to absorb energy from vehicle motion and/or the engine and convert the absorbed energy to an energy form suitable for storage by an energy storage device. Vehicle 302 may include a fully electric vehicle, incorporating fuel cells, solar energy capturing elements, and/or other energy storage systems for powering the vehicle.

As shown, an instrument panel 306 may include various displays and controls accessible to a human driver (also referred to as the user) of vehicle 302. For example, instrument panel 306 may include a touch screen 308 of an in-vehicle computing system or infotainment system 309 (e.g., an infotainment system), an audio system control panel, and an instrument cluster 310. Touch screen 308 may receive user input to the in-vehicle computing system or infotainment system 309 for controlling audio output, visual display output, navigation system display, user preferences, control parameter selection, and so on. While the example system shown in FIG. 3 includes audio system controls that may be performed via a user interface of in-vehicle computing system or infotainment system 309, such as touch screen 308 without a separate audio system control panel, in other embodiments, the vehicle may include an audio system control panel, which may include controls for a conventional vehicle audio system such as a radio, compact disc player, MP3 player, and so on. The audio system controls may include features for controlling one or more aspects of audio output via one or more speakers 312 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system or infotainment system 309 may adjust a radio station selection, a playlist selection, a source of audio input (e.g., from radio or CD or MP3), and so on, based on user input received directly via touch screen 308, or based on data regarding the user (such as a physical state and/or environment of the user) received via one or more external devices 350 and/or a mobile device 328. The audio system of the vehicle may include an amplifier (not shown) coupled to plurality of loudspeakers (not shown). In some embodiments, one or more hardware elements of in-vehicle computing system or infotainment system 309, such as touch screen 308, a display screen 311, various control dials, knobs and buttons, memory, processor(s), and any interface elements (e.g., connectors or ports) may form an integrated head unit that is installed in instrument panel 306 of the vehicle. The head unit may be fixedly or removably attached in instrument panel 306. In additional or alternative embodiments, one or more hardware elements of the in-vehicle computing system or infotainment system 309 may be modular and may be installed in multiple locations of the vehicle.

Cabin 300 may include one or more sensors for monitoring the vehicle, the user, and/or the environment. For example, cabin 300 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 300, and so on. Cabin 300 may also include an in-vehicle camera, such as in-vehicle camera 204 of FIG. 2. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, and so on. Information regarding ambient conditions of the vehicle, vehicle status, or vehicle driver may also be received from sensors external to/separate from the vehicle (that is, not part of the vehicle system), such as sensors coupled to external devices 350 and/or mobile device 328.

Cabin 300 may also include one or more user objects, such as mobile device 328, that are stored in the vehicle before, during, and/or after travelling. Mobile device 328 may include a smart phone, a tablet, a laptop computer, a portable media player, and/or any suitable mobile computing device. Mobile device 328 may be connected to the in-vehicle computing system via a communication link 330. Communication link 330 may be wired (e.g., via Universal Serial Bus (USB), Mobile High-Definition Link (MHL), High-Definition Multimedia Interface (HDMI), Ethernet, and so on) or wireless (e.g., via Bluetooth®, Wi-Fi®, Wi-Fi Direct®, Near-Field Communication (NFC), cellular connectivity, and so on) and configured to provide two-way communication between the mobile device and the in-vehicle computing system. (Bluetooth® is a registered trademark of Bluetooth SIG, Inc., Kirkland, WA. Wi-Fi® and Wi-Fi Direct® are registered trademarks of Wi-Fi Alliance, Austin, Texas.) Mobile device 328 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, communication link 330 may provide sensor and/or control signals from various vehicle systems (such as vehicle audio system, climate control system, and so on) and touch screen 308 to mobile device 328 and may provide control and/or display signals from mobile device 328 to the in-vehicle systems and touch screen 308. Communication link 330 may also provide power to mobile device 328 from an in-vehicle power source in order to charge an internal battery of the mobile device.

In-vehicle computing system or infotainment system 309 may also be communicatively coupled to additional devices operated and/or accessed by the user but located external to vehicle 302, such as one or more external devices 350. In the depicted embodiment, external devices 350 are located outside of vehicle 302 though it will be appreciated that in alternate embodiments, external devices 350 may be located inside cabin 300. The external devices may include a server computing system, cloud computing system (e.g., cloud 130 of FIG. 1 or cloud 250 of FIG. 2), personal computing system, portable electronic device, electronic wrist band, electronic head band, portable music player, electronic activity tracking device, pedometer, smart-watch, GPS system, and so on. External devices 350 may be connected to the in-vehicle computing system via a communication link 336 which may be wired or wireless, as discussed with reference to communication link 330, and configured to provide two-way communication between the external devices and the in-vehicle computing system. For example, external devices 350 may include one or more sensors, and communication link 336 may transmit sensor output from external devices 350 to in-vehicle computing system or infotainment system 309 and touch screen 308. External devices 350 may also store and/or receive information regarding contextual data, user behavior/preferences, operating rules, and so on and may transmit such information from the external devices 350 to in-vehicle computing system or infotainment system 309 and touch screen 308.

In-vehicle computing system or infotainment system 309 may analyze the input received from external devices 350, mobile device 328, and/or other input sources and select settings for various in-vehicle systems (such as climate control system, audio system, and/or navigation system), provide output via touch screen 308 and/or speakers 312, communicate with mobile device 328 and/or external devices 350, and/or perform other actions based on the assessment. In some embodiments, all or a portion of the assessment may be performed by mobile device 328 and/or external devices 350.

In some embodiments, one or more of the external devices 350 may be communicatively coupled to in-vehicle computing system or infotainment system 309 indirectly, via mobile device 328 and/or another of the external devices 350. For example, communication link 336 may communicatively couple external devices 350 to mobile device 328 such that output from external devices 350 is relayed to mobile device 328. Data received from external devices 350 may then be aggregated at mobile device 328 with data collected by mobile device 328, the aggregated data then transmitted to in-vehicle computing system or infotainment system 309 and touch screen 308 via communication link 330. Similar data aggregation may occur at a server system before being transmitted to in-vehicle computing system or infotainment system 309 and touch screen 308 via communication link 336 and/or communication link 330.

FIG. 4 shows a block diagram of in-vehicle computing system or infotainment system 309 configured and/or integrated inside vehicle 302, as introduced above with respect to FIG. 3. In-vehicle computing system or infotainment system 309 may perform one or more of the methods described herein in some embodiments. In some examples, in-vehicle computing system or infotainment system 309 may be a vehicle infotainment system configured to provide information-based media content (audio and/or visual media content, including entertainment content, navigational services, and so on) to a vehicle user to enhance the operator's in-vehicle experience. In-vehicle computing system or infotainment system 309 may include, or be coupled to, various vehicle systems, sub-systems, hardware components, as well as software applications and systems that are integrated in, or integratable into, vehicle 302 in order to enhance an in-vehicle experience for a driver and/or a passenger.

In-vehicle computing system or infotainment system 309 may include one or more processors including an operating system processor 414 and an interface processor 420. Operating system processor 414 may execute an operating system on the in-vehicle computing system and control input/output, display, playback, and other operations of the in-vehicle computing system. Interface processor 420 may interface with a vehicle control system 430 via an inter-vehicle system communication module 422.

Inter-vehicle system communication module 422 may output data to one or more other vehicle systems 431 and/or one or more other vehicle control elements 461 while also receiving data input from other vehicle systems 431 and other vehicle control elements 461, e.g., by way of vehicle control system 430. When outputting data, inter-vehicle system communication module 422 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as GPS sensors, and so on), digital signals propagated through vehicle data networks (such as an engine controller area network (CAN) bus through which engine related information may be communicated, a climate control CAN bus through which climate control related information may be communicated, and a multimedia data network through which multimedia data is communicated between multimedia components in the vehicle). For example, the in-vehicle computing system or infotainment system 309 may retrieve from the engine CAN bus the current speed of the vehicle estimated by the wheel sensors, a power state of the vehicle via a battery and/or power distribution system of the vehicle, an ignition state of the vehicle, and so on. In addition, other interfacing means such as Ethernet may be used as well without departing from the scope of this disclosure.

A storage device 408 may be included in in-vehicle computing system or infotainment system 309 to store data such as instructions executable by operating system processor 414 and/or interface processor 420 in non-volatile form. The storage device 408 may store application data, including prerecorded sounds, to enable in-vehicle computing system or infotainment system 309 to run an application for connecting to a cloud-based server (e.g., cloud 130 of FIG. 1 and/or cloud 250 of FIG. 2) and/or collecting information for transmission to the cloud-based server. The application may retrieve information gathered by vehicle systems/sensors, input devices (e.g., a user interface 418), data stored in one or more storage devices, such as a volatile memory 419A or a non-volatile (e.g., non-transitory) memory 419B, devices in communication with the in-vehicle computing system (e.g., a mobile device connected via a Bluetooth® link), and so forth. In-vehicle computing system or infotainment system 309 may further include a volatile memory 419A. Volatile memory 419A may be RAM. Non-transitory storage devices, such as non-volatile memory 419B, may store instructions and/or code that, when executed by a processor (e.g., operating system processor 414 and/or interface processor 420), controls the in-vehicle computing system or infotainment system 309 to perform one or more of the actions described in the disclosure.

A microphone 402 may be included in the in-vehicle computing system or infotainment system 309 to receive voice commands from a user, to measure ambient noise in the vehicle, to determine whether audio from speakers of the vehicle is tuned in accordance with an acoustic environment of the vehicle, and so on. A speech processing unit 404 may process voice commands, such as the voice commands received from the microphone 402. In some embodiments, in-vehicle computing system or infotainment system 309 may also be able to receive voice commands and sample ambient vehicle noise using a microphone included in an audio system 432 of the vehicle.

One or more additional sensors may be included in a sensor subsystem 410 of the in-vehicle computing system or infotainment system 309. For example, the sensor subsystem 410 may include a camera, such as a rear view camera for assisting a user in parking the vehicle and/or a cabin camera (e.g., in-vehicle camera) for identifying a user (e.g., using facial recognition and/or user gestures). Sensor subsystem 410 of in-vehicle computing system or infotainment system 309 may communicate with and receive inputs from various vehicle sensors and may further receive user inputs. For example, the inputs received by sensor subsystem 410 may include transmission gear position, transmission clutch position, gas pedal input, brake input, transmission selector position, vehicle speed, engine speed, mass airflow through the engine, ambient temperature, intake air temperature, and so on, as well as inputs from climate control system sensors (such as heat transfer fluid temperature, antifreeze temperature, fan speed, passenger compartment temperature, desired passenger compartment temperature, ambient humidity, and so on), an audio sensor detecting voice commands issued by a user, a fob sensor receiving commands from and optionally tracking the geographic location/proximity of a fob of the vehicle, and so forth.

While certain vehicle system sensors may communicate with sensor subsystem 410 alone, other sensors may communicate with both sensor subsystem 410 and vehicle control system 430 or may communicate with sensor subsystem 410 indirectly via vehicle control system 430. A navigation subsystem 411 of in-vehicle computing system or infotainment system 309 may generate and/or receive navigation information such as location information (e.g., via a GPS sensor and/or other sensors from sensor subsystem 410), route guidance (e.g., to avoid locations having high occurrences of driver state events), traffic information, point-of-interest (POI) identification, and/or provide other navigational services for the driver. Navigation subsystem 411 may be, or may be part of, navigation system 224 of FIG. 2, in embodiments.

An external device interface 412 of in-vehicle computing system or infotainment system 309 may be coupleable to and/or communicate with one or more external devices 350 located external to vehicle 302. While the external devices are illustrated as being located external to vehicle 302, it is to be understood that they may be temporarily housed in vehicle 302, such as when the user is operating the external devices while operating vehicle 302. In other words, the external devices 350 are not integral to vehicle 302. The external devices 350 may include a mobile device 328 (e.g., connected via a Bluetooth®, NFC, Wi-Fi Direct®, or other wireless connection) or an alternate Bluetooth®-enabled device 452.

Mobile device 328 may be a mobile phone, smart phone, wearable devices/sensors that may communicate with the in-vehicle computing system via wired and/or wireless communication, or other portable electronic device(s). Other external devices include one or more external services 446. For example, the external devices may include extra-vehicular devices that are separate from and located externally to the vehicle. Still other external devices include one or more external storage devices 454, such as solid-state drives, pen drives, USB drives, and so on. External devices 350 may communicate with in-vehicle computing system or infotainment system 309 either wirelessly or via connectors without departing from the scope of this disclosure. For example, external devices 350 may communicate with in-vehicle computing system or infotainment system 309 through external device interface 412 over a network 460, a USB connection, a direct wired connection, a direct wireless connection, and/or other communication link.

External device interface 412 may provide a communication interface to enable the in-vehicle computing system to communicate with mobile devices associated with contacts of the driver. For example, external device interface 412 may enable phone calls to be established and/or text messages (e.g., Short Message Service (SMS), Multimedia Message Service (MMS), and so on) to be sent (e.g., via a cellular communications network) to a mobile device associated with a contact of the driver. External device interface 412 may additionally or alternatively provide a wireless communication interface to enable the in-vehicle computing system to synchronize data with one or more devices in the vehicle (e.g., the driver's mobile device) via Wi-Fi Direct®, as described in more detail below.

One or more mobile device applications 444 may be operable on mobile device 328. As an example, mobile device application 444 may be operated to aggregate user data regarding interactions of the user with the mobile device. For example, mobile device application 444 may aggregate data regarding music playlists listened to by the user on the mobile device, telephone call logs (including a frequency and duration of telephone calls accepted by the user), positional information including locations frequented by the user and an amount of time spent at each location, and so on. The collected data may be transferred by mobile device application 444 to external device interface 412 over network 460. In addition, specific user data requests may be received at mobile device 328 from in-vehicle computing system or infotainment system 309 via external device interface 412. The specific data requests may include requests for determining where the user is geographically located, an ambient noise level and/or music genre at the user's location, an ambient weather condition (temperature, humidity, and so on) at the user's location, and so on. Mobile device application 444 may send control instructions to components (e.g., microphone, amplifier, and so on) or other applications (e.g., navigational applications) of mobile device 328 to enable the requested data to be collected on the mobile device or requested adjustment made to the components. Mobile device application 444 may then relay the collected information back to in-vehicle computing system or infotainment system 309. For example, mobile device application 444 may include a navigation application that is used in addition to or as an alternative to navigation subsystem 411.

Likewise, one or more external services applications 448 may be operable on external services 446. As an example, external services applications 448 may be operated to aggregate and/or analyze data from multiple data sources. For example, external services applications 448 may aggregate data from one or more social media accounts of the user, data from the in-vehicle computing system (e.g., sensor data, log files, user input, and so on), data from an internet query (e.g., weather data, POI data), and so on. The collected data may be transmitted to another device and/or analyzed by the application to determine a context of the driver, vehicle, and environment and perform an action based on the context (e.g., requesting/sending data to other devices).

Vehicle control system 430 may include controls for controlling aspects of various vehicle systems 431 involved in different in-vehicle functions. These may include, for example, controlling aspects of vehicle audio system 432 for providing audio entertainment to the vehicle occupants, aspects of a climate control system 434 for meeting the cabin cooling or heating needs of the vehicle occupants, as well as aspects of a telecommunication system 436 for enabling vehicle occupants to establish telecommunication linkage with others.

Audio system 432 may include one or more acoustic reproduction devices including electromagnetic transducers such as one or more speakers 435. Vehicle audio system 432 may be passive or active such as by including a power amplifier. In some embodiments, in-vehicle computing system or infotainment system 309 may be the only audio source for the acoustic reproduction device, or there may be other audio sources that are connected to the audio reproduction system (e.g., external devices such as a mobile phone). The connection of any such external devices to the audio reproduction device may be analog, digital, or any combination of analog and digital technologies.

Climate control system 434 may be configured to provide a comfortable environment within the cabin or passenger compartment of vehicle 302. Climate control system 434 includes components enabling controlled ventilation such as air vents, a heater, an air conditioner, an integrated heater and air-conditioner system, and so on. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 430 may also include controls for adjusting the settings of various vehicle control elements 461 (or vehicle controls, or vehicle system control elements) related to the engine and/or auxiliary elements within a cabin of the vehicle, such as one or more steering wheel controls 462 (e.g., steering wheel-mounted audio system controls, cruise controls, windshield wiper controls, headlight controls, turn signal controls, and so on), instrument panel controls, microphone(s), accelerator/brake/clutch pedals, a gear shift, door/window controls positioned in a driver or passenger door, seat controls, cabin light controls, audio system controls, cabin temperature controls, and so on. Vehicle control elements 461 may also include internal engine and vehicle operation controls (e.g., engine controller module, actuators, valves, and so on) that are configured to receive instructions via the CAN bus of the vehicle to change operation of one or more of the engine, exhaust system, transmission, and/or other vehicle system. The control signals may also control audio output at one or more speakers 435 of the vehicle's audio system 432. For example, the control signals may adjust audio output characteristics such as volume, equalization, audio image (e.g., the configuration of the audio signals to produce audio output that appears to a user to originate from one or more defined locations), audio distribution among a plurality of speakers, and so forth. Likewise, the control signals may control vents, air conditioner, and/or heater of climate control system 434. For example, the control signals may increase delivery of cooled air to a specific section of the cabin.

Vehicle control system 430 may further include an ADAS 437. ADAS 437 may be ADAS 240 of FIG. 2, for example. In addition to the functions previously described, ADAS 437 may provide lane-keeping assistance, emergency braking, blind-spot detection, and the like. ADAS 437 may thus provide instructions to vehicle control elements 461 to adjust steering, apply braking, adjust engine output, and so forth. ADAS 437 may further communicate data and instructions with navigation subsystem 411 and external devices 350 to report detected driver state events and receive navigation guidance, such as described above with respect to FIG. 2. In some embodiments, ADAS 437 may include one or more dedicated processors and one or more dedicated memories for performing the functions described herein, such as detecting driver state events and building driver profiles.

Control elements positioned on an outside of a vehicle (e.g., controls for a security system) may also be connected to in-vehicle computing system or infotainment system 309, such as via inter-vehicle system communication module 422. The control elements of the vehicle control system may be physically and permanently positioned on and/or in the vehicle for receiving user input. In addition to receiving control instructions from in-vehicle computing system or infotainment system 309, vehicle control system 430 may also receive input from one or more external devices 350 operated by the user, such as from mobile device 328. This allows aspects of vehicle systems 431 and vehicle control elements 461 to be controlled based on user input received from the external devices 350.

In-vehicle computing system or infotainment system 309 may further include one or more antennas 406. The in-vehicle computing system may obtain broadband wireless internet access via antennas 406, and may further receive broadcast signals such as radio, television, weather, traffic, and the like. The in-vehicle computing system or infotainment system 309 may receive positioning signals such as GPS signals via antennas 406. The in-vehicle computing system may also receive wireless commands via radio frequency (RF), such as via antennas 406 or via infrared or other means through appropriate receiving devices. In some embodiments, antennas 406 may be included as part of audio system 432 or telecommunication system 436. Additionally, antennas 406 may provide AM/FM radio signals to external devices 350 (such as to mobile device 328) via external device interface 412.

One or more elements of the in-vehicle computing system or infotainment system 309 may be controlled by a user via user interface 418. User interface 418 may include a graphical user interface presented on a touch screen, such as touch screen 308 and/or display screen 311 of FIG. 3, and/or user-actuated buttons, switches, knobs, dials, sliders, and so on. For example, user-actuated elements may include steering wheel controls, door and/or window controls, instrument panel controls, audio system settings, climate control system settings, and the like. A user may also interact with one or more applications of the in-vehicle computing system or infotainment system 309 and mobile device 328 via user interface 418. In addition to receiving a user's vehicle setting preferences on user interface 418, vehicle settings selected by in-vehicle control system may be displayed to a user on user interface 418. Notifications and other messages (e.g., received messages), as well as navigational assistance, may be displayed to the user on a display of the user interface. User preferences/information and/or responses to presented messages may be performed via user input to the user interface.

Figure 5:
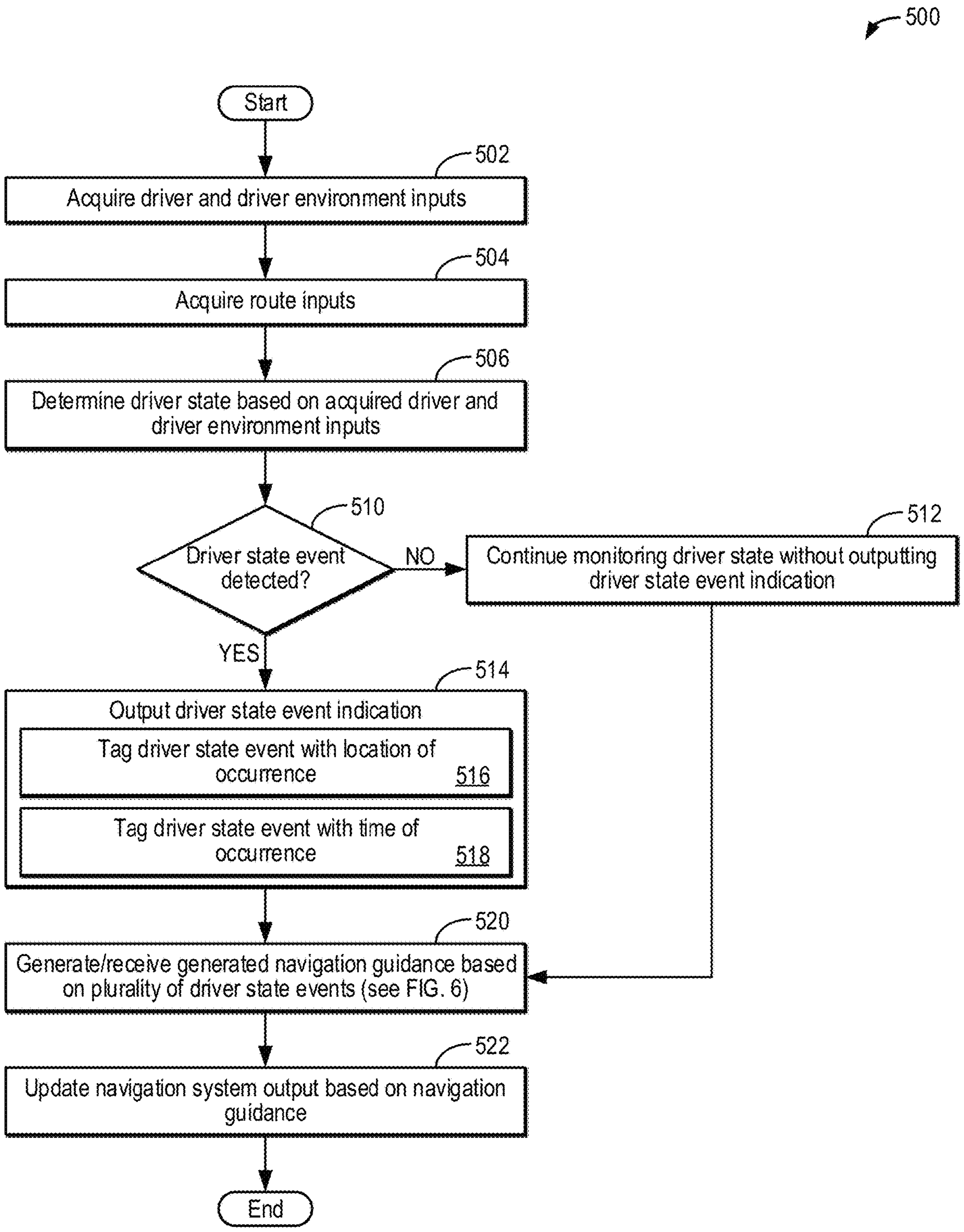
FIG. 5 shows a method for detecting driver state events and updating a navigation system output based on navigation guidance generated from the detected driver state events in accordance with one or more embodiments of the present disclosure.

FIG. 5 shows a method 500 for generating and outputting navigation guidance based on driver state events in accordance with one or more embodiments of the present disclosure. Method 500 may comprise an acquiring 502, an acquiring 504, a determining 506, a detecting 510, a continuing 512, an outputting 514, a generating and/or receiving 520, and/or an updating 522. At least a portion of method 500 may be executed by an ADAS of a vehicle, such as ADAS 240 of FIG. 2 or ADAS 437 of FIG. 4, of a vehicle control system (e.g., vehicle control system 430 of FIG. 4). In some embodiments, at least a portion of method 500 may be executed by a cloud computing platform, such as cloud 130 of FIG. 1 or cloud 250 of FIG. 2.

In acquiring 502, driver and driver environment inputs are acquired. Examples of the driver and driver environment inputs include driver images, a cabin occupancy input, and a driving behavior input, such as described with respect to FIG. 2 (e.g., driver and driver environment inputs 212). Other examples of driver environment inputs may include audio system settings, climate control settings, and other settings that may affect driver comfort.

In acquiring 504, route inputs are acquired. The route inputs may include a location input and a trajectory input, such as described above with respect to FIG. 2 (e.g., route inputs 230). For example, location input may be received via GPS sensors (e.g., via sensor subsystem 410 of FIG. 4), via antennas (e.g., antennas 406 of FIG. 4), and/or via a navigation system (e.g., navigation subsystem 411 of FIG. 4). The location input may specify a coordinate position of the vehicle, and the trajectory input may specify a direction of travel as well as a traveled route for a pre-determined duration of time (e.g., 30 minutes).

In determining 506, a driver state is determined based on the acquired driver and driver environment inputs. The driver state may be determined via a driver state monitor (e.g., driver state monitor 242 of FIG. 2), such as described above. The driver state monitor may distinguish different cognitive and emotional states by tracking eye and other facial movements, for example. Thus, the driver state monitor may characterize the driver state (e.g., a current state of the driver of the vehicle) as alert, focused, distracted, sleepy, drowsy, asleep, awake, calm, and the like.

In detecting 510, it is determined if a driver state event is detected. The driver state event may be detected in response to the current state of the driver being one that may impair or impede the driver's ability to operate the vehicle, such as when the driver state is distracted, sleepy, drowsy, and/or asleep. The driver state event might not be detected in response to the current state of the driver not being one that may impair or impede the driver's ability to operate the vehicle, such as when the driver state is determined to be alert and focused.

In response to the driver state event not being detected, in continuing 512, the driver state is continued to be monitored without outputting a driver state event indication, and method 500 may proceed to generating and/or receiving 520. In response to the driver state event being detected, method 500 may proceed to outputting 514.

In outputting 514, the driver state event indication is output. Outputting 514 may further include a tagging 516 and a tagging 518. In tagging 516, the driver state event is tagged with a location of its occurrence, as determined from the location input. In tagging 518, the driver state event is tagged with a time of its occurrence (e.g., date, time, day of week). Outputting 514 may include outputting the driver state event indication, including a type of driver state event (e.g., the detected driver state) tagged with the location and the time, to the cloud. In some embodiments, outputting 514 may further include outputting the driver state event indication to a driver profile (e.g., driver profile 244).

Figure 6:
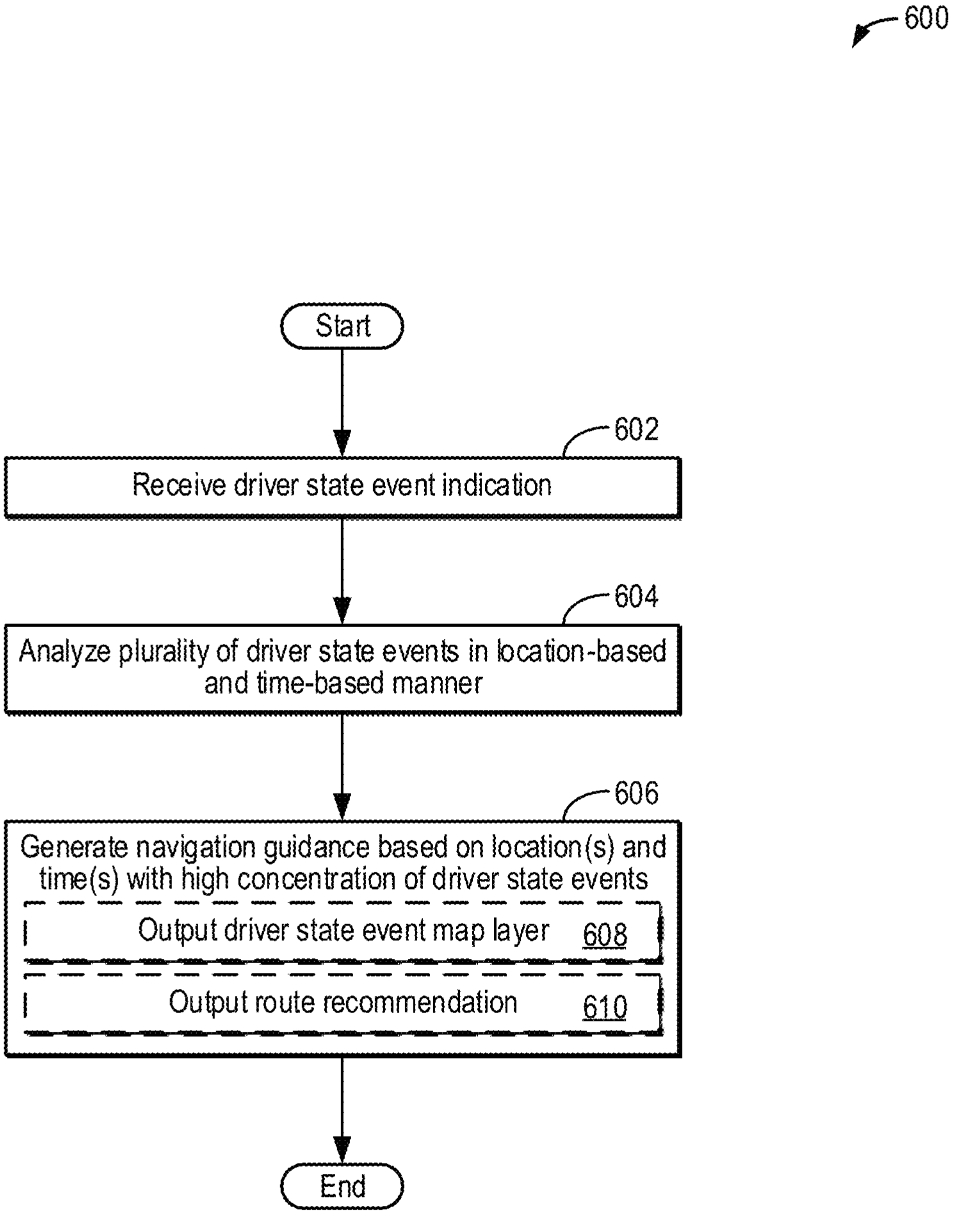
FIG. 6 shows a method for generating navigation guidance based on detected driver state events in accordance with one or more embodiments of the present disclosure.
Figure 7A:
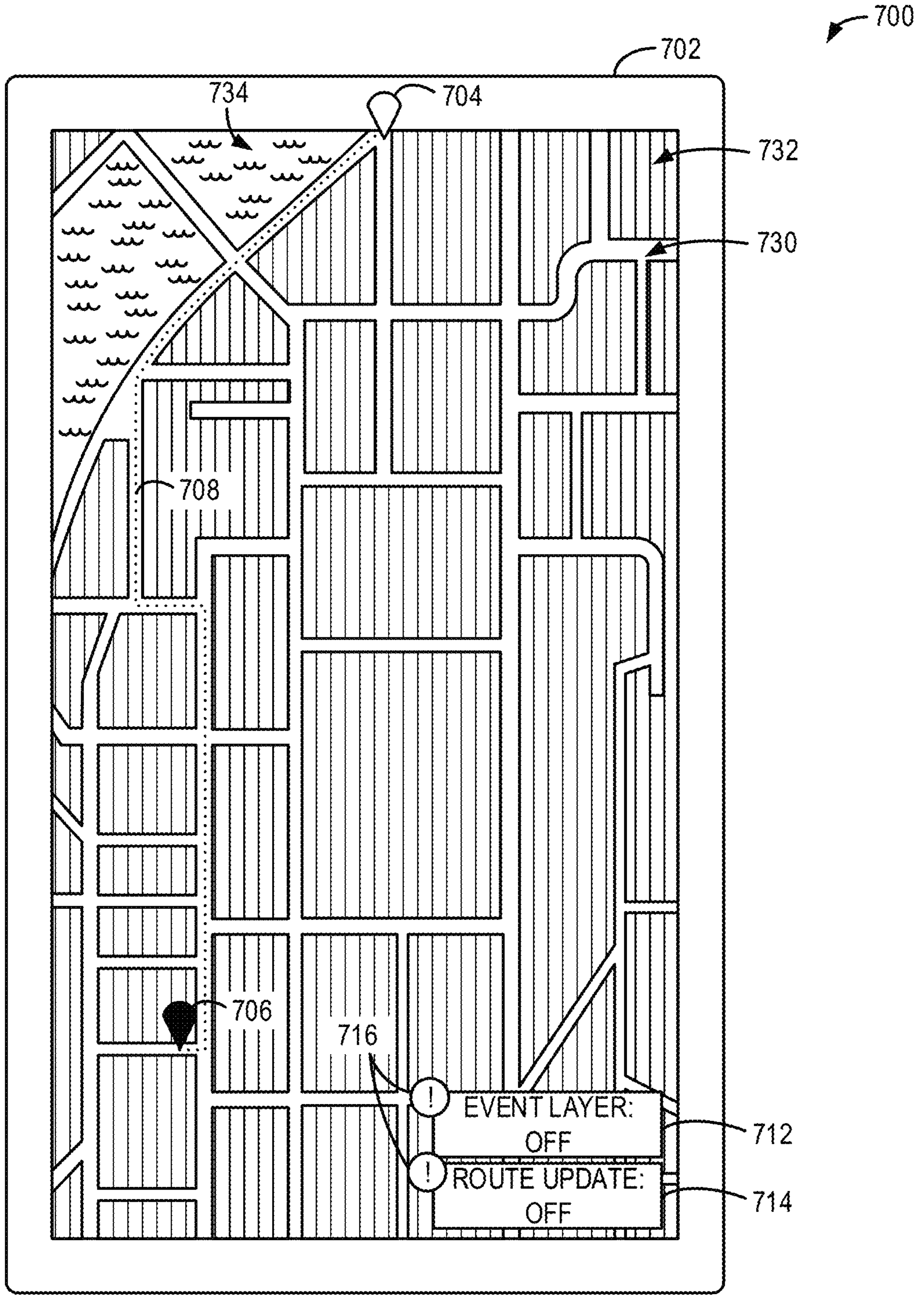
FIGS. 7A-7C show exemplary navigation system outputs in accordance with one or more embodiments of the present disclosure.
Figure 7B:
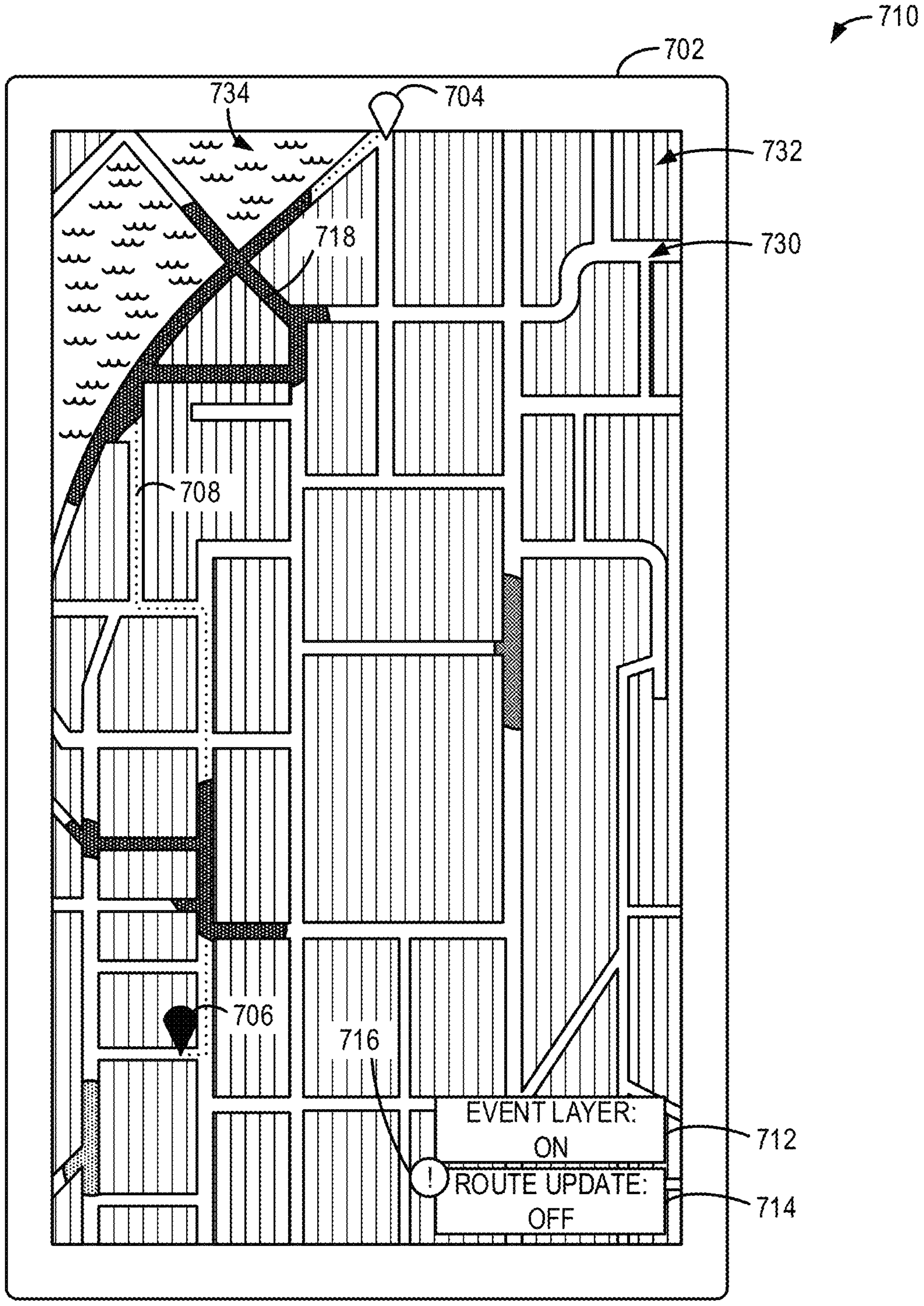
Figure 7C:
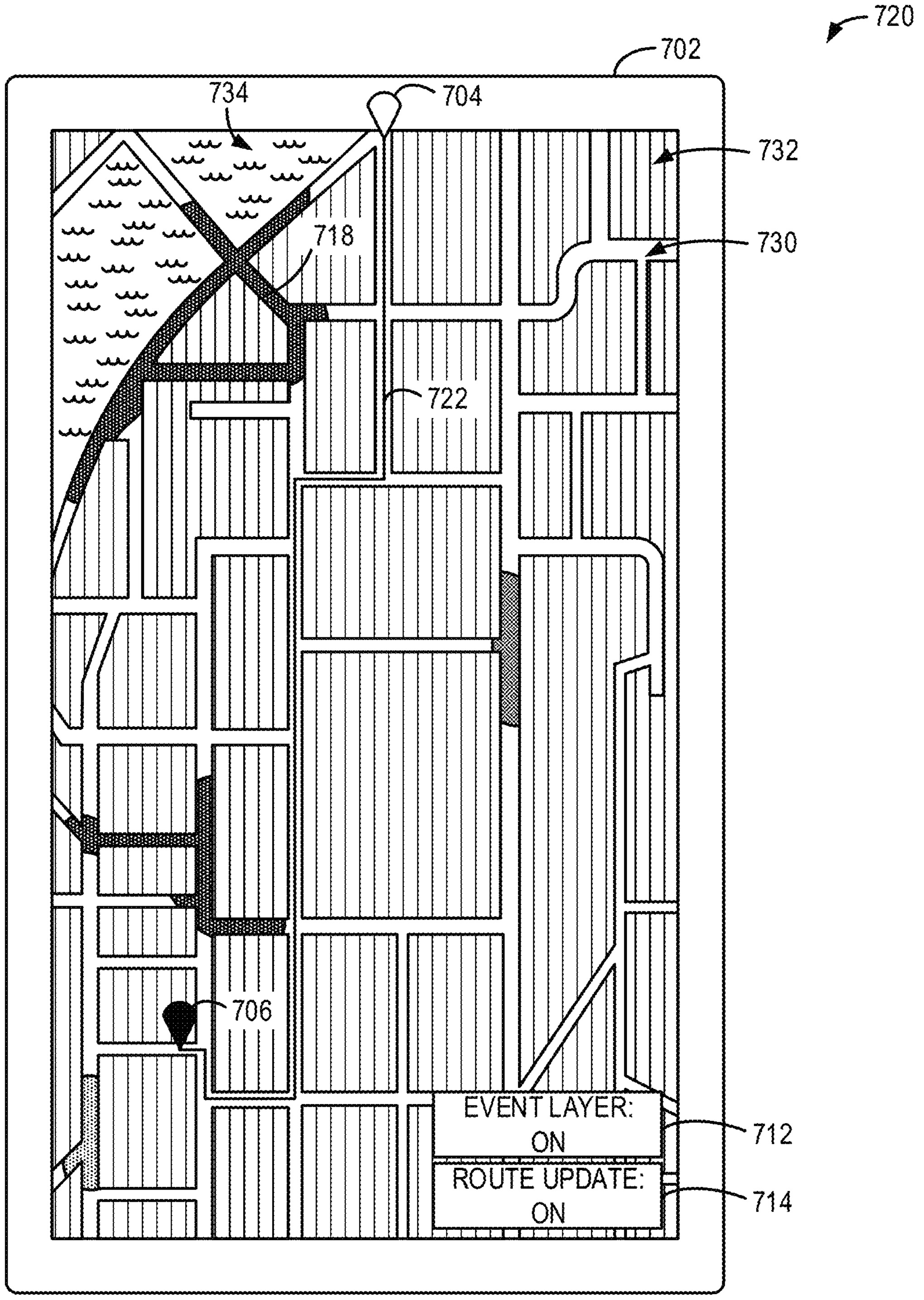

In generating and/or receiving 520, navigation guidance is generated and/or received based on a plurality of driver state events, as will be further described with respect to FIG. 6. In embodiments, the vehicle may receive the navigation guidance from the cloud, and the plurality of driver state events may include driver state events for a plurality of different drivers in a plurality of different vehicles. In some embodiments, additionally or alternatively, the ADAS of the vehicle may generate or adjust the navigation guidance based on the driver profile in order to provide navigation guidance that is specific to the individual driver. Thus, the navigation guidance may be generated from externally provided data (e.g., from the cloud) and/or locally collected data. Further, the navigation guidance may include a route recommendation and/or a map layer.

In updating 522, a navigation system output is updated based on the navigation guidance. The navigation system output may be a displayed map (e.g., displayed via a display screen) and/or a displayed navigation route. For example, the displayed map may be updated to include a driver state event map layer that indicates areas having high occurrences of driver state events, such as determined via a cluster analysis (e.g., via the method of FIG. 6). Similarly, the navigation route may be updated to exclude or reduce travel through the areas having the high occurrences of driver state events. Further, the navigation system may be integral to the vehicle or may be an application on an external device (e.g., a mobile device, such as mobile device 342 of FIGS. 3 and 4) in communication with the in-vehicle computing system.

Method 500 may then end. In various embodiments, method 500 may be repeated continuously or at a predetermined frequency during vehicle operation so that the driver and driver environment inputs and the route inputs are updated over time and driver state events are detected and output accordingly.

FIG. 6 shows a method 600 for statistically analyzing a plurality of driver state events to generate navigation guidance in accordance with one or more embodiments of the present disclosure. Method 600 may comprise a receiving 602, an analyzing 604, and/or a generating 606. At least a portion of method 600 may be executed by a cloud computing platform, such as cloud 130 of FIG. 1 or cloud 250 of FIG. 2. In some embodiments, method 600 may be executed in combination with processes or methods executed by a control system of a vehicle, such as an ADAS of the vehicle (e.g., ADAS 240 of FIG. 2 or ADAS 437 of FIG. 4).

In receiving 602, a driver state event indication is received. As explained above with respect to FIGS. 2 and 5, the driver state event indication may provide an indication that a driver state event has occurred and may be tagged with a location and time of its occurrence. However, the driver state event indication might not include identifying or demographic information for the driver and may thus be an anonymous report of the driver state event, including a type of the driver state event. In some embodiments, a driver profile of the ADAS may store the driver state event indication, thus tagging or attaching identifying information to the driver state event indication that does not leave the vehicle.

In analyzing 604, a plurality of the driver state events is analyzed in a location-based and time-based manner. The plurality of driver state events may undergo a cluster analysis, for example, to identify specific locations that have a statistically higher occurrence or concentration of the driver state events. The time-based analysis may further include identifying specific travel times of day within the specific locations that have a statistically higher occurrence of the driver state events. When the analyzing is performed via the cloud, the plurality of driver state events comprises driver state event indications received from a plurality of different vehicles for a plurality of different drivers. When the analyzing is performed within the ADAS, the plurality of driver state events comprises multiple driver state events for one individual driver. Thus, analyzing 604 may identify statistically significant clusters of driver state events in a location-based and/or time-based manner.

In generating 606, navigation guidance is generated based on the location(s) and time(s) having the high concentration of driver state events. The navigation guidance comprises a driver state event map layer and/or a route recommendation. The driver state event map layer may be configured as a heat map or may use another type of visual representation, such as lines, points, icons, and the like to indicate areas having driver state event clusters. The route recommendation may include a recommended travel route to avoid or reduce traveling through locations having driver state event clusters. The route recommendation may incorporate a driver-specified origin and/or a driver-specified destination. In some embodiments, the route recommendation may recommend roadways based on a current travel trajectory even when the driver-specified destination is not provided.

Generating 606 optionally includes an outputting 608 and/or an outputting 610. In outputting 608, the diver state event map layer is output. In outputting 610, the route recommendation is output. Outputting 608 and outputting 610 may include outputting the corresponding navigation guidance (e.g., the driver state event map layer and/or the route recommendation) to a navigation system of one or more vehicles, for example. The driver state event map layer and/or the route recommendation may be output based on a request received from the vehicle and/or a navigation system within the vehicle (e.g., integrated within the vehicle or communicatively coupled to the vehicle). Thus, the navigation guidance may be generated even when not output or displayed.

Method 600 may then end. In various embodiments, method 600 may be performed continually or repeated at a pre-determined frequency, such as additional driver state event indications are received, in order to re-analyze the plurality of driver state events and update the navigation guidance accordingly. As such, the navigation guidance may be adjusted continually or at the pre-determined frequency.

FIGS. 7A-7C show exemplary outputs of a navigation system in accordance with embodiments described herein. The navigation system may be navigation system 224 of FIG. 2 and/or navigation subsystem 411 of FIG. 4 and includes a display 702. Display 702 may be a touch-sensitive display, for example, that shows a map and navigation information to a driver and receives user inputs from the driver. The map includes roadways 730 between blocks/land masses 732 that are not drivable roadways and water 734. The navigation information includes an event layer toggle 712 and a route update toggle 714 as well as a driver state event alert icon 716. Event layer toggle 712 enables the driver to switch between observing a map layer for driver state events, when “on,” and not observing the map layer for the driver state events, when “off.” Similarly, route update toggle 714 enables the driver to switch between receiving a recommended route generated based on the driver state events, when “on,” and not receiving the recommended route, when “off.” The driver may tap on event layer toggle 712 and route update toggle 714 or provide another pre-programmed input (e.g., button press, voice command) to switch between the “on” state and the “off” state.

In FIG. 7A, a first navigation system output 700 is shown on display 702. First navigation system output 700 shows an origin 704 and a destination 706 within the map and a route 708 between origin 704 and destination 706. Each of origin 704 and destination 706 may be input by the driver, for example. Route 708 may be a fastest route or a shortest route based on distance. Further, event layer toggle 712 and route update toggle 714 are each set to “off.” However, event layer toggle 712 and route update toggle 714 each include driver state event alert icon 716, indicating that map information and route updates are available if the driver wishes to avoid areas with high occurrences of driver state events.

In FIG. 7B, a second navigation system output 710 is shown on display 702. Second navigation system output 710 also shows route 708 between origin 704 and destination 706. However, event layer toggle 712 is set to “on.” As a result, a driver state event map layer 718 is shown. In FIG. 7B, driver state event map layer 718 indicates areas having high driver state event occurrences in a heat map-like fashion with shaded areas of varying intensities, although other visual indicators are also possible. For example, the intensity of the shading may increase as a concentration of driver state events increases. With driver state event map layer 718 shown on display 702, the driver may decide if an alternative route from route 708 is desired in order to avoid traveling through roadways having clustered driver state event occurrences. For example, the driver may mentally update their driven route using the navigation guidance provided by driver state event map layer 718 while route update toggle 714 remains “off.”

In FIG. 7C, a third navigation system output 720 is shown on display 702. Route update toggle 714 is set to “on” in third navigation system output 720, and thus third navigation system output 720 shows an updated route 722 between origin 704 and destination 706. Updated route 722 avoids traveling through roadways having driver state event clustering, as shown by driver state event map layer 718. Note that although not specifically shown in FIGS. 7A-7C, the navigation system output may show updated route 722 while not showing driver state event map layer 718 (e.g., route update toggle 714 may be set to “on” while event layer toggle 712 is set to “off”).

In this way, systems and methods are provided for providing navigation guidance by leveraging information received by an ADAS. As a result, map layers and route guidance may be generated in order to decrease driver drowsiness and/or distraction. As a result, higher driver satisfaction may be achieved. Further occurrences of driver state events may be reduced by avoiding routes having characteristics that induce driver state events and/or by alerting the driver to the propensity of certain routes to induce driver state events.

The disclosure also provides support for a method of operation of a navigation system of a vehicle, comprising: detecting a plurality of driver state events via an advanced driver assistance system (ADAS), generating navigation guidance based on the plurality of driver state events detected via ADAS, and communicating the navigation guidance to a user of the vehicle via the navigation system, the navigation system comprising a display and the navigation guidance including at least one of a route recommendation and a map layer which are displayed via the display of the navigation system. In a first example of the method, the plurality of driver state events is detected via one of a plurality of different ADAS for a plurality of drivers and an individual driver of the vehicle, wherein the individual driver of the vehicle is the user of the vehicle, wherein the method further comprises: outputting driver state events for the plurality of drivers to a cloud computing system and outputting driver state events for the individual driver to a driver profile. In a second example of the method, optionally including the first example, generating the navigation guidance based on the plurality of driver state events detected via the ADAS comprises: detecting each driver state event of the plurality of driver state events via the ADAS, and tagging each driver state event of the plurality of driver state events with a location of occurrence. In a third example of the method, optionally including one or both of the first and second examples, generating the navigation guidance based on the plurality of driver state events detected via the ADAS further comprises tagging each driver state event of the plurality of driver state events with a time of occurrence. In a fourth example of the method, optionally including one or more or each of the first through third examples, generating the navigation guidance based on the plurality of driver state events detected via the ADAS further comprises statistically grouping the plurality of driver state events with respect to location of occurrence. In a fifth example of the method, optionally including one or more or each of the first through fourth examples, generating the navigation guidance based on the plurality of driver state events detected via the ADAS further comprises statistically grouping the plurality of driver state events with respect to time of occurrence within the location of occurrence. In a sixth example of the method, optionally including one or more or each of the first through fifth examples, statistically grouping the plurality of driver state events comprises performing a cluster analysis. In a seventh example of the method, optionally including one or more or each of the first through sixth examples, detecting each driver state event of the plurality of driver state events via the ADAS comprises: receiving images of the plurality of drivers of a plurality of vehicles at the ADAS, analyzing facial structures in the received images of the plurality of drivers to determine a state of each of the plurality of drivers, and outputting a driver state event indication in response to the state being one or more of asleep, tired, and distracted. In a eighth example of the method, optionally including one or more or each of the first through seventh examples, the map layer comprises a heat map display of driver state event clustering. In a ninth example of the method, optionally including one or more or each of the first through eighth examples, the route recommendation reduces vehicle travel through locations and travel times having high driver state event clustering.

The disclosure also provides support for a method for navigation, comprising: generating a navigation route for a vehicle based on navigation guidance determined from at least one of internally provided data collected within the vehicle and externally provided data, the navigation guidance comprising at least one of a map layer and a route recommendation determined based on driver state events, and communicating the navigation route to a user of the vehicle via a display of a navigation system housed inside the vehicle. In a first example of the method, the externally provided data comprises data received from a cloud computing system and the internally provided data comprises data of a driver profile received from a plurality of images of a driver of the vehicle obtained via an in-vehicle camera. In a second example of the method, optionally including the first example, the route recommendation generated from the externally provided data comprises a general vehicle route recommendation, wherein the general vehicle route recommendation is determined via the cloud computing system based on location and time of occurrences of the driver state events reported to the cloud computing system for a plurality of drivers. In a third example of the method, optionally including one or both of the first and second examples, the method further comprises: performing a first cluster analysis on the driver state events detected from the plurality of drivers to define locations and times having statistically significant clusters of the driver state events via the cloud computing system. In a fourth example of the method, optionally including one or more or each of the first through third examples, the route recommendation generated from the internally provided data comprises an individualized vehicle route recommendation, and the method further comprises: determining the individualized vehicle route recommendation based on a second cluster analysis of the driver state events for the driver of the vehicle to define locations having statistically significant clusters of driver state events particular to the driver of the vehicle. In a fifth example of the method, optionally including one or more or each of the first through fourth examples, the route recommendation reduces an extent of travel through locations having statistically significant clusters of driver state events based on at least one of internally provided data collected within the vehicle and externally provided data, wherein the route recommendation generated based on the internally provided data is individualized to a driver of the vehicle and the route recommendation generated based on the externally provided data is generalized based on data of a plurality of drivers uploaded to a cloud computing system. In a sixth example of the method, optionally including one or more or each of the first through fifth examples, the driver state events comprise at least one of a distracted state, a fatigued state, and a sleepy state.

The disclosure also provides support for a vehicle system, comprising, one or more processors, an in-vehicle camera housed within a cabin of the vehicle, an advanced driver assistance system (ADAS), a navigation system comprising a display, and a non-transitory memory including instructions that, when executed, cause the one or more processors to: detect driver state events in the vehicle based on driver images acquired by the in-vehicle camera and analysis of the driver images performed by the ADAS, report the driver state events to a cloud computing platform in an anonymized manner and to a driver profile specific to a driver imaged by the in-vehicle camera, and receive navigation guidance from the cloud computing platform, the navigation guidance determined by one of the cloud computing platform based on the driver state events reported by a plurality of vehicles and the driver profile specific to the driver of the vehicle. In a first example of the system, the non-transitory memory further includes further instructions that, when executed, cause the one or more processors to: output the navigation guidance to the display of the navigation system within the vehicle, the navigation guidance comprising at least one of a map layer and a route recommendation. In a second example of the system, optionally including the first example, the driver state events comprise occurrences of at least one of a tired, fatigued, and distracted driver, the map layer comprises a heat map indicating statistically significant clusters of the driver state events, and the route recommendation comprises a navigation route that reduces an extent of travel through the statistically significant clusters of the driver state events.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as computing device(s) 132 and in-vehicle computing system or infotainment system 309 described with reference to FIGS. 1-4. The methods may be performed by executing stored instructions with one or more logic devices (e.g., processors) in combination with one or more additional hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word “a” or “an” should be understood as not excluding plural of said elements or steps, unless such exclusion is stated. Furthermore, references to “one embodiment” or “one example” of the present disclosure are not intended to be interpreted as excluding the existence of additional embodiments that also incorporate the recited features. The terms “first,” “second,” and “third,” and so on. are used merely as labels, and are not intended to impose numerical requirements or a particular positional order on their objects. The following claims particularly point out subject matter from the above disclosure that is regarded as novel and non-obvious.

The invention claimed is:

1. A method of operation of a navigation system of a vehicle, comprising:

detecting a plurality of driver state events via an advanced driver assistance system (ADAS), wherein detecting the plurality of driver state events comprises analyzing data from a combination of an in-vehicle camera, seat sensors providing cabin occupancy data, and at least one of pedal position sensors and steering wheel sensors;

generating navigation guidance based on the plurality of driver state events detected via ADAS; and communicating the navigation guidance to a user of the vehicle via the navigation system, the navigation system comprising a display and the navigation guidance including at least one of a route recommendation and a map layer which are displayed via the display of the navigation system;

outputting the plurality of driver state events to a cloud computing platform in an anonymized manner such that identifying information of the driver is removed from the reported driver state events, and separately retaining, within the ADAS, a driver profile that includes identifying information specific to an individual driver of the vehicle detected via the in-vehicle camera;

determining, based on the navigation guidance, that the vehicle is approaching a location having high driver state event clustering; and in response to determining that the vehicle is approaching the location having high driver state event clustering, automatically adjusting at least one vehicle operating parameter via the ADAS, wherein the at least one vehicle operating parameter comprises at least one of lane-keeping assistance level, vehicle speed, and driver alert output level.

2. The method of claim 1, wherein the plurality of driver state events is detected via one of a plurality of different ADAS for a plurality of drivers and the individual driver of the vehicle, wherein the individual driver of the vehicle is the user of the vehicle, wherein the method further comprises:

outputting driver state events for the plurality of drivers to the cloud computing system.

3. The method of claim 2, wherein detecting each driver state event of the plurality of driver state events via the ADAS comprises:

receiving images of the plurality of drivers of a plurality of vehicles at the ADAS;

analyzing facial structures in the received images of the plurality of drivers to determine a state of each of the plurality of drivers; and outputting a driver state event indication in response to the state being one or more of asleep, tired, and distracted.

4. The method of claim 1, wherein generating the navigation guidance based on the plurality of driver state events detected via the ADAS comprises:

detecting each driver state event of the plurality of driver state events via the ADAS; and tagging each driver state event of the plurality of driver state events with a location of occurrence.

5. The method of claim 4, wherein generating the navigation guidance based on the plurality of driver state events detected via the ADAS further comprises tagging each driver state event of the plurality of driver state events with a time of occurrence.

6. The method of claim 1, wherein generating the navigation guidance based on the plurality of driver state events detected via the ADAS further comprises statistically grouping the plurality of driver state events with respect to location of occurrence.

7. The method of claim 6, wherein generating the navigation guidance based on the plurality of driver state events detected via the ADAS further comprises statistically grouping the plurality of driver state events with respect to time of occurrence within the location of occurrence.

8. The method of claim 7, wherein statistically grouping the plurality of driver state events comprises performing a cluster analysis.

9. The method of claim 1, wherein the map layer comprises a heat map display of driver state event clustering.

10. The method of claim 1, wherein the route recommendation reduces vehicle travel through locations and travel times having high driver state event clustering.

11. A method for navigation, comprising:

receiving, at a cloud computing system, externally provided data comprising a plurality of driver state events from a plurality of vehicles, each driver state event tagged with a location of occurrence and a time of occurrence, wherein the plurality of driver state events are received in an anonymized manner such that identifying information of respective drivers has been removed prior to transmission to the cloud computing system;

performing, via the cloud computing system, a cluster analysis on the plurality of driver state events in both a location-based manner and a time-based manner to identify statistically significant clusters of driver state events, wherein the location-based manner identifies specific locations having a statistically higher occurrence of the driver state events and the time-based manner identifies specific times of day within the specific locations having a statistically higher occurrence of the driver state events;

generating, via the cloud computing system, a navigation route for a vehicle based on navigation guidance determined from at least one of internally provided data collected within the vehicle and the externally provided data from the cloud computing system, wherein the internally provided data comprises data of a driver profile retained locally within an ADAS of the vehicle, the driver profile received from a plurality of images of a driver of the vehicle obtained via an in-vehicle camera and retaining identifying information specific to the driver, wherein the navigation guidance comprises a map layer and a route recommendation, wherein the route recommendations is determined based on the cluster analysis of the plurality of driver state events, wherein the map layer is dynamically updated based on a time of day to indicate time-specific clustering of the driver state events, and wherein the map layer changes depending on the time of day to coincide with the time-specific clustering of the driver state events;

communicating the navigation route to a user of the vehicle via a display of a navigation system housed inside the vehicle;

determining, based on the navigation route, that the vehicle is approaching a location having high driver state event clustering; and in response to determining that the vehicle is approaching the location having high driver state event clustering, automatically adjusting at least one vehicle operating parameter via an advanced driver assistance system (ADAS) of the vehicle by adjusting the at least one vehicle operating parameter.

12. The method of claim 11, wherein the internally provided data comprises data of a driver profile received from a plurality of images of a driver of the vehicle obtained via an in-vehicle camera.

13. The method of claim 12, wherein the route recommendation generated from the externally provided data comprises a general vehicle route recommendation, wherein the general vehicle route recommendation is determined via the cloud computing system based on location and time of occurrences of the driver state events reported to the cloud computing system for a plurality of drivers.

14. The method of claim 13, wherein performing the cluster analysis comprises performing a first cluster analysis on the driver state events detected from the plurality of drivers to define locations and times having statistically significant clusters of the driver state events via the cloud computing system.

15. The method of claim 14, wherein the route recommendation generated from the internally provided data comprises an individualized vehicle route recommendation, and the method further comprises:

determining the individualized vehicle route recommendation based on a second cluster analysis of the driver state events for the driver of the vehicle to define locations having statistically significant clusters of driver state events particular to the driver of the vehicle.

16. The method of claim 11, wherein the route recommendation reduces an extent of travel through locations having statistically significant clusters of driver state events based on at least one of internally provided data collected within the vehicle and externally provided data, wherein the route recommendation generated based on the internally provided data is individualized to a driver of the vehicle and the route recommendation generated based on the externally provided data is generalized based on data of a plurality of drivers uploaded to a cloud computing system.

17. The method of claim 11, wherein the driver state events comprise at least one of a distracted state, a fatigued state, and a sleepy state.

18. A vehicle system, comprising:

one or more processors;

an in-vehicle camera housed within a cabin of the vehicle;

an advanced driver assistance system (ADAS);

a navigation system comprising a display; and a non-transitory memory including instructions that, when executed, cause the one or more processors to:

detect driver state events in the vehicle based on driver images acquired by the in-vehicle camera and analysis of the driver images performed by the ADAS, wherein detecting the driver state events comprises analyzing data from a combination of the in-vehicle camera, seat sensors, and at least one of pedal position sensors and steering wheel sensors;

report the driver state events to a cloud computing platform in an anonymized manner such that identifying information of the driver is removed from the reported driver state events and separately retain, within the ADAS, a driver profile specific to a driver imaged by the in-vehicle camera that retains identifying information specific to the driver;

receive navigation guidance from the cloud computing platform, the navigation guidance determined by one of the cloud computing platform based on the driver state events reported by a plurality of vehicles and the driver profile specific to the driver of the vehicle, wherein the navigation guidance comprises a map layer indicating statistically significant clusters of driver state events identified via a cluster analysis performed in both a location-based manner and a time-based manner, wherein the map layer is dynamically updated based on a time of day to indicate time-specific clustering of the driver state events such that the map layer changes depending on the time of day to coincide with the time-specific clustering of the driver state events, and a route recommendation that reduces travel through locations having the statistically significant clusters of driver state events;

provide, via the display of the navigation system, an interactive user interface comprising: a first toggle control selectable by a user to switch between displaying and not displaying the map layer; and a second toggle control selectable by the user to switch between receiving and not receiving the route recommendation; wherein the map layer and the route recommendation are displayed via the navigation system based on user input received via the first toggle control and the second toggle control, respectively;

determine, based on the received navigation guidance, that the vehicle is approaching a location having high driver state event clustering; and in response to determining that the vehicle is approaching the location having high driver state event clustering, automatically adjust at least one vehicle operating parameter via the ADAS, wherein the at least one vehicle operating parameter comprises at least one of lane-keeping assistance level, vehicle speed, and driver alert output level.

19. The navigation system of claim 18, wherein the non-transitory memory further includes further instructions that, when executed, cause the one or more processors to:

output the navigation guidance to the display of the navigation system within the vehicle, the navigation guidance comprising at least one of a map layer and a route recommendation.

20. The navigation system of claim 19, wherein:

the driver state events comprise occurrences of at least one of a tired, fatigued, and distracted driver;

the map layer comprises a heat map indicating statistically significant clusters of the driver state events; and the route recommendation comprises a navigation route that reduces an extent of travel through the statistically significant clusters of the driver state events.

* * * * *